US012793518B2

(12) United States Patent
Park et al.

(10) Patent No.: US 12,793,518 B2
(45) Date of Patent: Nov. 10, 2026

(54) WEARABLE DEVICE, METHOD, AND COMPUTER-READABLE STORAGE MEDIUM FOR PROVIDING AUDIO CORRESPONDING TO EMERGENCY SIREN

(71) Applicant: Samsung Electronics Co., Ltd., Suwon-si (KR)

(72) Inventors: Youngbae Park, Suwon-si (KR); Joonrae Cho, Suwon-si (KR); Myoungsung Sim, Suwon-si (KR); Myeungseon Kim, Suwon-si (KR); Choonho Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/091,419

(22) Filed: Mar. 26, 2025

(65) Prior Publication Data

US 2026/0011222 A1 Jan. 8, 2026

Related U.S. Application Data

(63) Continuation of application No. PCT/KR2025/099705, filed on Mar. 12, 2025.

(30) Foreign Application Priority Data

Jul. 4, 2024 (KR) ........................ 10-2024-0088358
Jul. 9, 2024 (KR) ........................ 10-2024-0090776

(51) Int. Cl.
*G08B 3/10* (2006.01)
*G08B 21/02* (2006.01)

(52) U.S. Cl.
CPC ............... *G08B 3/10* (2013.01); *G08B 21/02* (2013.01)

(58) Field of Classification Search
CPC .................................... G08B 3/10; G08B 2/02
(Continued)

(56) References Cited

U.S. PATENT DOCUMENTS 7,702,114 B2 4/2010 Aarts
9,937,355 B2 4/2018 Kaib et al.
11,076,228 B2 7/2021 Lee et al.

FOREIGN PATENT DOCUMENTS

EP 3355287 B1 * 7/2019 ............... G08B 3/10
JP 6606936 B2 11/2019
(Continued)

OTHER PUBLICATIONS

Search Report and Written Opinion dated Jun. 12, 2025 issued in International Patent Application No. PCT/KR2025/099705.
(Continued)

*Primary Examiner* — Kam Wan Ma
(74) *Attorney, Agent, or Firm* — Nixon & Vanderhye, P.C.

(57) ABSTRACT

A wearable device includes memory, including one or more storage mediums, storing instructions, a speaker, and at least one processor including processing circuitry, and the instructions, when executed by the at least one processor individually or collectively, cause the wearable device to, based on an emergency state of a user, to provide audio corresponding to an emergency siren, output a first audio signal, through the speaker, on a first frequency range with first sound pressure and after outputting the first audio signal, output a second audio signal through the speaker on a second frequency range having audible sensitivity higher than audible sensitivity in the first frequency range with second sound pressure greater than the first sound pressure, wherein a resonant frequency of the speaker is changed from the first resonant frequency to the second resonant frequency
(Continued)

lower than the first resonant frequency in accordance with outputting the first audio signal.

20 Claims, 16 Drawing Sheets

(58) Field of Classification Search
USPC .......................................................... 340/692
See application file for complete search history.

(56) References Cited

FOREIGN PATENT DOCUMENTS

| | | | | | |
|---|---|---|---|---|---|
| JP | 6872723 | B2 | | 4/2021 | |
| KR | 10-2006-0076772 | | | 7/2006 | |
| KR | 20090041585 | A | | 4/2009 | |
| KR | 10-1125642 | | | 3/2012 | |
| KR | 10-1691142 | | | 1/2017 | |
| KR | 10-2017-0143239 | | | 12/2017 | |
| KR | 20200126158 | A | | 11/2020 | |
| KR | 20230110193 | A | * | 7/2023 | ............. G06F 1/163 |

OTHER PUBLICATIONS

Korean National Police Agency, “If something happens to someone somewhere”, Identify, Jul. 4, 2014, 5 pages.
Kim, “Analysis of sound pressure level and frequency characteristics of alarm bells and electronic sirens”, Aug. 2021, 11 pages.

* cited by examiner

WEARABLE DEVICE, METHOD, AND COMPUTER-READABLE STORAGE MEDIUM FOR PROVIDING AUDIO CORRESPONDING TO EMERGENCY SIREN

CROSS-REFERENCE TO RELATED APPLICATIONS

This application is a continuation International Application No. PCT/KR2025/099705 designating the United States, filed on Mar. 12, 2025, in the Korean Intellectual Property Receiving Office and claiming priority to Korean Patent Application Nos. 10-2024-0088358, filed on Jul. 4, 2024, and 10-2024-0080776, filed on Jul. 9, 2024, in the Korean Intellectual Property Office, the disclosures of each of which are incorporated by reference herein in their entireties.

BACKGROUND

Field

The disclosure relates to a wearable device, a method, and a computer-readable storage medium for providing audio corresponding to an emergency siren.

Description of Related Art

Various services are provided through a wearable device. The wearable device may be operated by being worn on a part of a body of a user. The wearable device may provide a service based on a user's emergency state in a state of being worn on the part of the body of the user.

The above-described information may be provided as a related art for the purpose of helping to understand the present disclosure. No assertion or determination is made as to whether any of the above-described information may be applied as a prior art related to the present disclosure.

SUMMARY

A wearable device is described. According to an example embodiment, the wearable device may comprise memory, comprising one or more storage mediums, storing instructions, a speaker, and at least one processor comprising processing circuitry. The instructions, when executed by the at least one processor individually or collectively, may cause the wearable device to detect a user's emergency state. The instructions, when executed by the at least one processor individually or collectively, may cause the wearable device to, based on the emergency state, to provide audio corresponding to an emergency siren, output a first audio signal, through the speaker having a first resonant frequency, on a first frequency range with first sound pressure. The instructions, when executed by the at least one processor individually or collectively, may cause the wearable device to, after outputting the first audio signal, output a second audio signal through the speaker having a second resonant frequency on a second frequency range having audible sensitivity higher than audible sensitivity in the first frequency range with second sound pressure greater than the first sound pressure. Wherein a resonant frequency of the speaker may be changed from the first resonant frequency to the second resonant frequency lower than the first resonant frequency in accordance with outputting the first audio signal.

A method is described. According to an example embodiment, the method may be performed in a wearable device comprising a speaker. The method may comprise: detecting a user's emergency state. The method may comprise, based on the emergency state, to provide audio corresponding to an emergency siren, outputting a first audio signal, through the speaker having a first resonant frequency, on a first frequency range with first sound pressure. The method may comprise, after outputting the first audio signal, outputting a second audio signal through the speaker having a second resonant frequency on a second frequency range having audible sensitivity higher than audible sensitivity in the first frequency range with second sound pressure greater than the first sound pressure. Wherein a resonant frequency of the speaker may be changed from the first resonant frequency to the second resonant frequency lower than the first resonant frequency in accordance with outputting the first audio signal.

A non-transitory computer-readable storage medium is described. According to an example embodiment, the non-transitory computer readable storage medium may store one or more programs. The one or more programs may comprise instructions to, when executed by a wearable device comprising a speaker, cause the wearable device to detect a user's emergency state. The one or more programs may comprise instructions to, when executed by the wearable device, cause the wearable device to, based on the emergency state, to provide audio corresponding to an emergency siren, output a first audio signal, through the speaker having a first resonant frequency, on a first frequency range with first sound pressure. The one or more programs may comprise instructions to, when executed by the wearable device, cause the wearable device to, after outputting the first audio signal, output a second audio signal through the speaker having a second resonant frequency on a second frequency range having audible sensitivity higher than audible sensitivity in the first frequency range with second sound pressure greater than the first sound pressure. Wherein a resonant frequency of the speaker may be changed from the first resonant frequency to the second resonant frequency lower than the first resonant frequency in accordance with outputting the first audio signal.

BRIEF DESCRIPTION OF THE DRAWINGS

In connection with the description of the drawings, the same or similar reference numeral may be used for the same or similar component. Further, the above and other aspects, features and advantages of certain embodiments of the present disclosure will be more apparent from the following detailed description, taken in conjunction with the accompanying drawings, in which.

DETAILED DESCRIPTION

Figure 1:
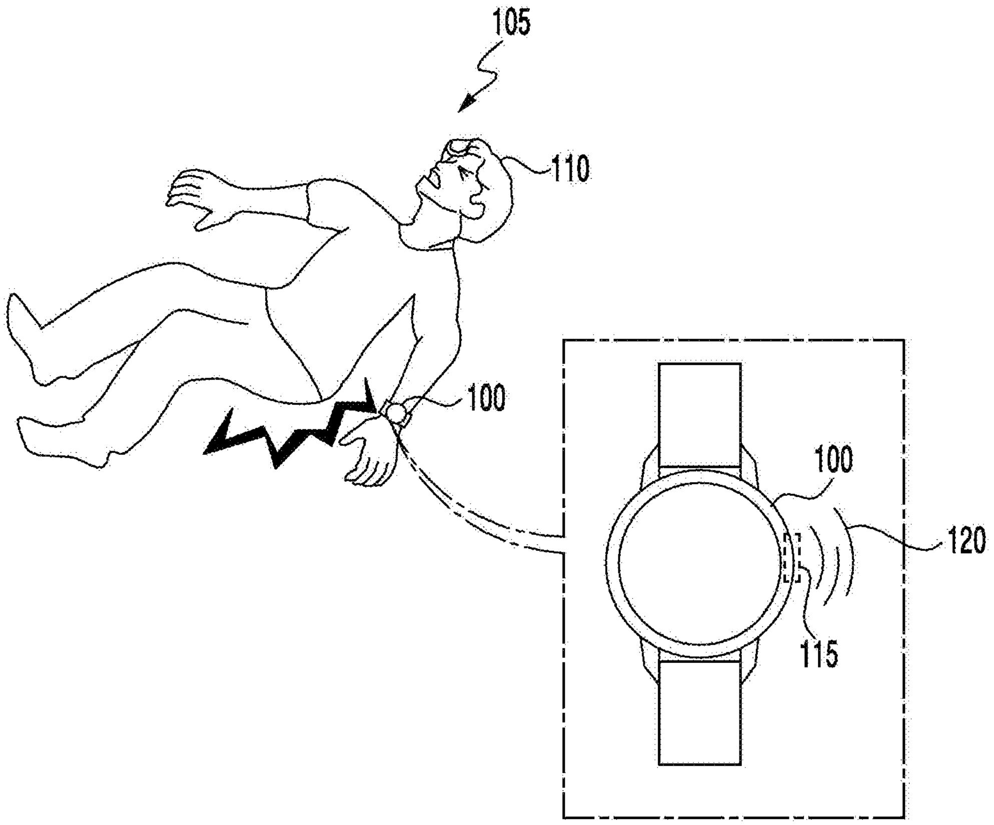
FIG. 1 is a diagram illustrating an example of audio corresponding to an emergency siren provided based on an emergency state according to various embodiments.

Hereinafter, various example embodiments of the present disclosure will be described in greater detail with reference to the drawings. However, the present disclosure may be implemented in various different forms and is not limited to the example embodiments described herein. In connection with the description of the drawings, the same or similar reference numeral may be used for the same or similar component. In addition, in the drawing and the related description, the description of a well-known function and a configuration may be omitted for clarity and brevity.

FIG. 1 is a diagram illustrating an example of audio corresponding to an emergency siren provided based on an emergency state according to various embodiments.

Referring to FIG. 1, a wearable device 100 may be a device for providing audio corresponding to an emergency siren. For example, the wearable device 100 may be used to detect an emergency state of a user 110 wearing the wearable device 100. For example, and without limitation, the wearable device 100 may be implemented in various shapes that may be worn by a user, such as a smart watch, a smart band, a smart ring, a wireless earphone, smart glasses, or the like including circuits (or circuitry) to provide the audio corresponding to an emergency siren. In the following disclosure, for convenience of explanation, an example in which the wearable device 100 is formed in a watch shape will be described and it will be understood that the disclosure is not limited thereto.

For example, a state 105 may be described as an emergency state of the user 110. For example, in the state 105, the wearable device 100 may detect the emergency state of the user 110. For example, the emergency state of the user 110 may include an accident situation (e.g., a fall situation) of the user 110.

For example, the wearable device 100 may include a speaker 115. For example, the speaker 115 may be used to provide the audio corresponding to an emergency siren. For example, the wearable device 100 may provide the audio corresponding to an emergency siren based on the emergency state of the user 110. For example, the wearable device 100 may output an audio signal 120 through the speaker 115 to provide the audio corresponding to an emergency siren. The audio signal 120 for providing the audio corresponding to an emergency siren is illustrated and described in greater detail below with reference to FIG. 2.

Figure 2:
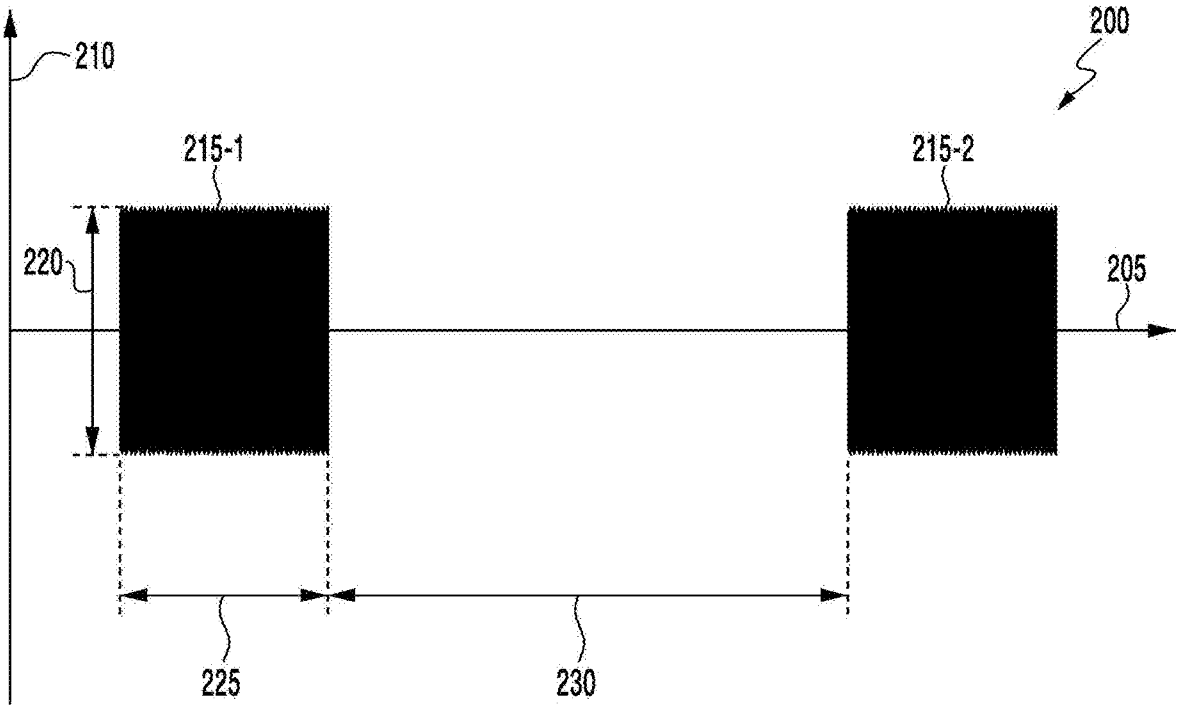
FIG. 2 is a diagram illustrating an example of an audio signal corresponding to an emergency siren according to various embodiments.

FIG. 2 is a diagram illustrating an example of an audio signal for providing audio corresponding to an emergency siren according to various embodiments.

Referring to FIG. 2, a chart 200 represents a change in sound pressure of audio signals 215-1 and 215-2 according to time. A horizontal axis 205 in the chart 200 represents time, and a vertical axis 210 in the chart 200 represents the sound pressure of the audio signals 215-1 and 215-2.

For example, the sound pressure of the audio signals 215-1 and 215-2 may be represented as a vertical length of an object corresponding to the audio signals 215-1 and 215-2 in the chart 200.

For example, an wearable device 100 may output the audio signal 215-1 through a speaker (e.g., the speaker 115 of FIG. 1) to provide audio corresponding to an emergency siren based on an emergency state of a user (e.g., the user 110 of FIG. 1). For example, the wearable device 100 may output the audio signal 215-1 to notify the emergency state of the user. For example, the audio signal 215-1 may be output with sound pressure 220. For example, it may be required to output an audio signal with relatively large sound pressure to effectively notify the emergency state of the user. For example, the sound pressure 220 may correspond to full-scale sound pressure. For example, the wearable device 100 may effectively notify the emergency state of the user by outputting the audio signal 215-1 with the sound pressure 220 corresponding to the full-scale sound pressure.

For example, the wearable device 100 may output the audio signal 215-1 during a time interval 225. For example, the wearable device 100 needs to output the audio signal 215-1 for long enough time to notify the emergency state of the user. For example, as the wearable device 100 outputs the audio signal 215-1 with the sound pressure 220 corresponding to the full-scale sound pressure during the long enough time interval 225, heat generation of the speaker may increase. For example, by increasing the heat generation of the speaker, the speaker may be damaged. For example, the user may feel uncomfortable due to the heat generation of the speaker.

For example, the wearable device 100 may cease (or refrain from, or not output) outputting the audio signal 215-1 during a time interval 230 to reduce the heat generation of the speaker. For example, in order to effectively reduce the heat generation of the speaker, it may be required for the wearable device 100 to cease outputting the audio signal 215-1 during the relatively long time interval 230 after outputting the audio signal 215-1. For example, the wearable device 100 may not effectively notify the emergency state of the user by ceasing (or refraining from or not outputting) outputting the audio signal 215-1 during the relatively long time interval 230. For example, in order to effectively notify the emergency state of the user, the wearable device 100 needs to reduce the time interval 230 during which outputting the audio signal 215-1 is ceased. For example, a method may be required to reduce the time interval 230 during which outputting the audio signal 215-1 is ceased. For example, in order to reduce the time interval 230 during which outputting the audio signal 215-1 is ceased, the wearable device 100 may reduce the heat generation of the speaker generated by outputting the audio signal 215-1.

For example, by reducing the heat generation of the speaker, the wearable device 100 may reduce the time interval 230 during which outputting the audio signal 215-1 is ceased. For example, the wearable device 100 may effectively notify the emergency state of the user by reducing the time interval 230 during which outputting the audio signal 215-1 is ceased. For example, the wearable device 100 may reduce damage to the speaker or eliminate discomfort of the user due to the heat generation of the speaker by reducing the heat generation of the speaker.

For example, in order to reduce the heat generation of the speaker, the wearable device 100 may output another audio signal with sound pressure smaller than the sound pressure 220 before outputting the audio signal 215-1. For example, the wearable device 100 may reduce the heat generation of the speaker by outputting the audio signal 215-1 during a shorter time interval than the time interval 225 after outputting the other audio signal.

The wearable device 100 may execute operations to be illustrated and described in greater detail below with reference to FIGS. 4 to 8 to reduce the heat generation of the speaker. The wearable device 100 may include components for executing the operations. The components may be illustrated and described in greater detail below with reference to FIG. 3.

Figure 3:
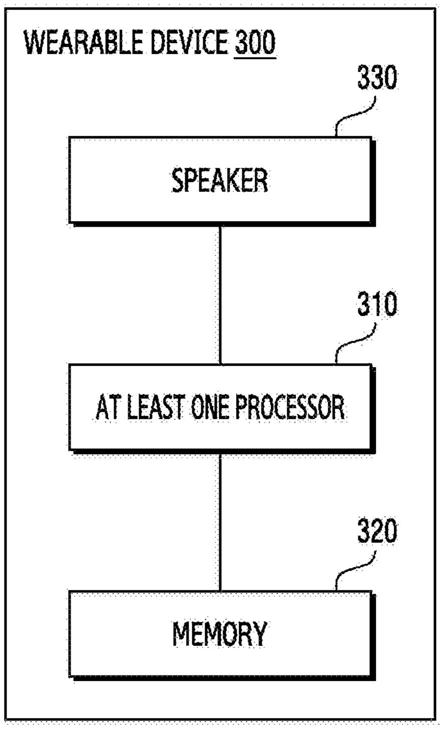
FIG. 3 is a block diagram illustrating an example configuration of a wearable device according to various embodiments.

FIG. 3 is a block diagram illustrating an example configuration of a wearable device according to various embodiments.

Referring to FIG. 3, a wearable device 300 may be implemented in various shapes that may be worn by a user, such as, for example, and without limitation, a smart watch, a smart band, a smart ring, a wireless earphone, smart glasses, or the like. In the following disclosure, for convenience of explanation, an example in which the wearable device 300 is formed in a watch shape will be described. For example, the wearable device 300 may include the wearable device 100 of FIG. 1 or may correspond to the wearable device 100 of FIG. 1. For example, the wearable device 300 may include at least a portion of an electronic device 1104 of FIG. 11 or may correspond to at least a portion of the electronic device 1104 of FIG. 11. For example, the wearable device 300 may include at least one processor (e.g., including processing circuitry) 310, memory 320, and a speaker 330.

The at least one processor 310 may include processing circuitry. For example, the at least one processor 310 may include a central processing unit (CPU) (e.g., including the processing circuitry). For example, the at least one processor 310 may include a graphic processing unit (GPU) (e.g., including the processing circuitry) and/or a neural processing unit (NPU) (e.g., including the processing circuitry). For example, the at least one processor 310 may be described as an application processor. For example, the at least one processor 310 may be configured to control the memory 320 and the speaker 330. The at least one processor 310 may be configured to execute instructions stored in the memory 320 individually or collectively to cause the wearable device 300 to perform at least a portion of the operations illustrated and described with reference to FIGS. 1 and 2. The at least one processor 310 may be configured to execute the instructions stored in the memory 320 to cause the wearable device 300 to perform at least a portion of operations illustrated in the description of FIGS. 4 to 8. The at least one processor 310 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The memory 320 may include one or more storage mediums. For example, the memory 320 may store various data used by at least one component (e.g., the at least one processor 310 and the speaker 330) of the wearable device 300. For example, the data may include input data or output data for software and a command associated therewith. The memory 320 may include a volatile memory or a non-volatile memory.

The speaker 330 may be configured to output an audio signal. For example, the speaker 330 may correspond to the speaker 115 of FIG. 1. For example, the speaker 330 may be configured to output an audio signal to provide audio corresponding to an emergency siren.

The wearable device 300 illustrated in the description of FIG. 3 may execute at least a portion of the operations illustrated and described in greater detail below with reference to FIGS. 4 to 8. For example, the operations illustrated in the description of FIGS. 4 to 8 may be caused by (or in) the wearable device 300 under control of the at least one processor 310.

Figure 4:
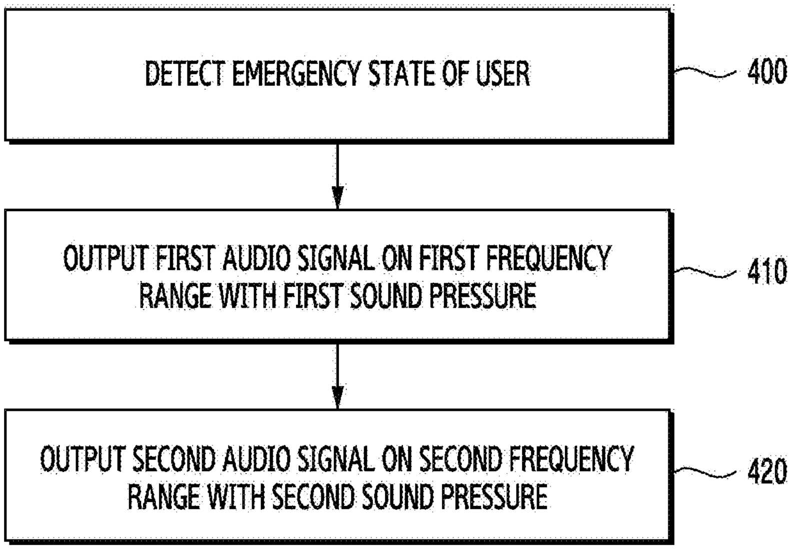
FIG. 4 is a flowchart illustrating example operations of a wearable device for providing audio corresponding to an emergency siren, according to various embodiments.

FIG. 4 is a flowchart illustrating example operations of a wearable device for providing audio corresponding to an emergency siren, according to various embodiments.

In the following example, each operation may be sequentially performed, but is not necessarily performed sequentially. For example, an order of each operation may be changed, and at least two operations may be performed in parallel.

Referring to FIG. 4, in operation 400, at least one processor 310 may detect an emergency state of a user (e.g., the user 110 of FIG. 1). For example, the emergency state of the user may include an accident situation (e.g., a fall situation) of the user.

As a non-limiting example, the wearable device 300 may further include a sensor (e.g., an acceleration sensor, a gyro sensor, a photoplethysmography (PPG) sensor, an atmospheric pressure sensor, and/or an electrode sensor). For example, the at least one processor 310 may detect the emergency state of the user based on biometric information of the user obtained through the sensor.

As a non-limiting example, the at least one processor 310 may receive an input indicating that the user is in the emergency state. For example, the input may be provided through an input means (e.g., a button) of the wearable device 300. For example, the input may be provided through a display (e.g., a touch screen) of the wearable device 300. For example, the at least one processor 310 may detect the emergency state of the user based on the input. However, it is not limited thereto.

As a non-limiting example, the wearable device 300 may be described as a virtual reality (VR) device and/or an augmented reality (AR) device. For example, the at least one processor 310 may provide a virtual space. For example, the at least one processor 310 may detect that the user is in the emergency state outside the virtual space. For example, the at least one processor 310 may provide audio corresponding to an emergency siren based on the user being in the emergency state outside the virtual space. However, it is not limited thereto.

As a non-limiting example, the wearable device 300 may further include communication circuitry. For example, the wearable device 300 may establish a connection with an external electronic device using the communication circuitry. For example, the external electronic device may receive the input indicating that the user is in the emergency state while connected to the wearable device 300. For example, the external electronic device may transmit a signal to cause to execute a function for the emergency state of the user in the wearable device 300 based on the input. For example, the at least one processor 310 may receive the signal from the external electronic device through the communication circuitry. For example, the at least one processor 310 may detect the emergency state of the user based on the signal. However, it is not limited thereto.

In operation 410, the at least one processor 310 may provide the audio corresponding to an emergency siren based on the emergency state of the user. For example, the at least one processor 310 may output a first audio signal (e.g., a first audio signal 515-1 of FIG. 5A) on a first frequency range with first sound pressure (e.g., first sound pressure 520 of FIG. 5A) through a speaker 330 to provide the audio corresponding to an emergency siren.

In an operation 420, the at least one processor 310 may output a second audio signal (e.g., a second audio signal 530-1 of FIG. 5A) on a second frequency range with second sound pressure (e.g., second sound pressure 535 of FIG. 5A) through the speaker 330 after outputting the first audio signal to provide the audio corresponding to an emergency siren. For example, the second sound pressure may be greater than the first sound pressure. For example, the second frequency range may have audible sensitivity higher than audible sensitivity of the first frequency range.

The first audio signal and the second audio signal are illustrated and described in greater detail below with reference to FIG. 5A.

Figure 5A:
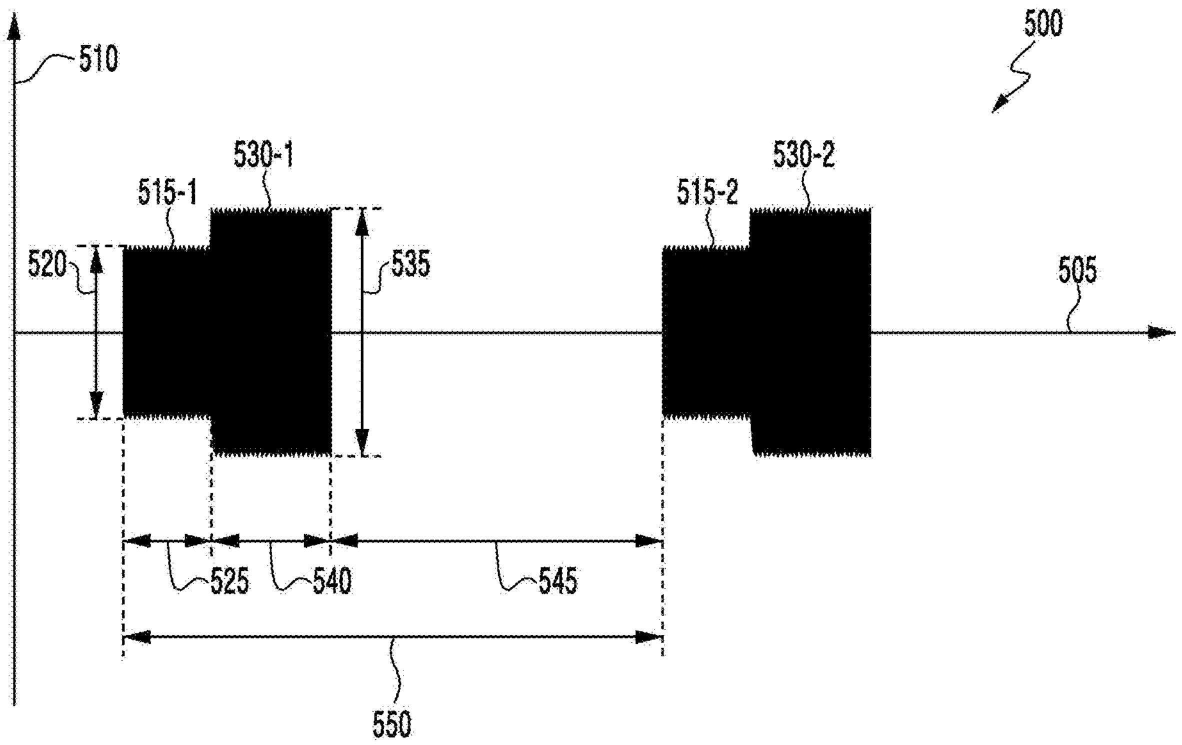
FIG. 5A is a diagram illustrating an example of audio signals corresponding to an emergency siren according to various embodiments.

FIG. 5A is a diagram illustrating an example of audio signals corresponding to an emergency siren according to various embodiments.

Referring to FIG. 5A, a chart 500 represents a change in sound pressure of audio signals (e.g., a first audio signal 515-1 and a second audio signal 530-1) according to time. A horizontal axis 505 in the chart 500 indicates time, and a vertical axis 510 in the chart 500 indicates sound pressure of an audio signal.

For example, the sound pressure of the audio signal may be represented by a vertical length of an object corresponding to the audio signal in the chart 500.

For example, at least one processor 310 may output the first audio signal 515-1 through a speaker 330 to provide audio corresponding to an emergency siren based on an emergency state of a user (e.g., the user 110 of FIG. 1). For example, the first audio signal 515-1 may be output on a first frequency range. For example, the first frequency range may be defined as a frequency range output with the largest sound pressure among frequency ranges in which the first audio signal 515-1 is output.

For example, the at least one processor 310 may output the first audio signal 515-1 to burn-in (or age or break-in) the speaker 330.

For example, the at least one processor 310 may output the first audio signal 515-1 during a relatively short first time interval 525 by outputting the first audio signal 515-1 to burn-in (or age or break-in) the speaker 330. For example, the at least one processor 310 may output the first audio signal 515-1 with first sound pressure 520, which is relatively small sound pressure, by outputting the first audio signal 515-1 to burn-in (or age or break-in) the speaker 330. For example, since the at least one processor 310 outputs the first audio signal 515-1 with the first sound pressure 520, which is the relatively small sound pressure, heat generation of the speaker 330 may be relatively low.

For example, the speaker 330 may be burned-in (or aged or broken-in) in accordance with outputting the first audio signal 515-1. For example, a resonant frequency of the speaker 330 may change from a first resonant frequency to a second resonant frequency as the speaker 330 is burned-in (or aged or broken-in). For example, the second resonant frequency may be lower than the first resonant frequency. The resonant frequency of the speaker 330 in accordance with outputting the first audio signal 515-1 is illustrated and described in greater detail below with reference to FIG. 6.

Figure 6:
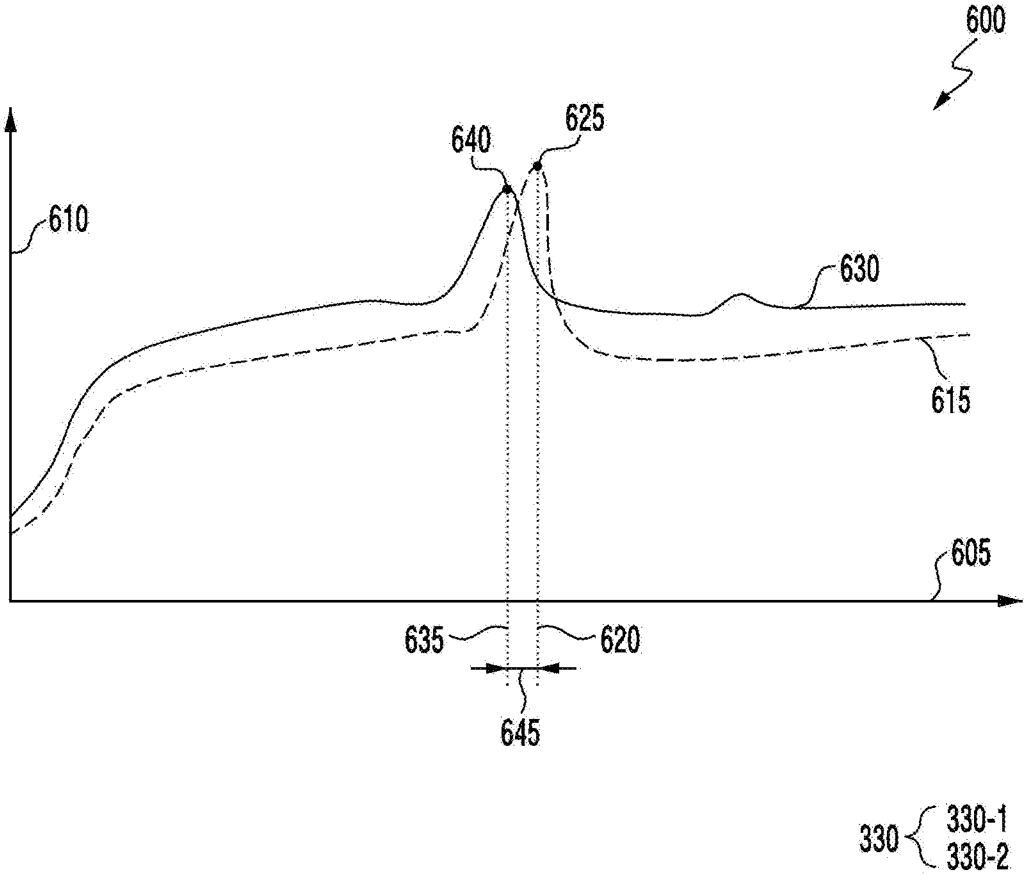
FIG. 6 is a graph illustrating an example of a resonant frequency of a speaker according to various embodiments.

FIG. 6 is a graph illustrating an example of a resonant frequency of a speaker according to various embodiments.

Referring to FIG. 6, a graph 600 represents a change in maximum sound pressure of an audio signal that may be output through a speaker 330 according to a frequency. A horizontal axis 605 in the chart 600 indicates a frequency of an audio signal, and a vertical axis 610 in the chart 600 indicates the maximum sound pressure of the audio signal that may be output through the speaker 330.

For example, maximum sound pressure of an audio signal that may be output through a speaker 330-1 in a first state before outputting a first audio signal (e.g., the first audio signal 515-1 of FIG. 5A) may be represented as a line 615. For example, the maximum sound pressure of the audio signal that may be output through the speaker 330-1 in the first state may be indicated as first sound pressure 625 at a first frequency 620. For example, the first sound pressure 625 may be a maximum value of the maximum sound pressure of the audio signal that may be output through the speaker 330-1 in the first state. For example, the speaker 330-1 in the first state may have the first frequency 620 as a resonant frequency by having the maximum sound pressure of the audio signal that may be output at the first frequency 620 as the first sound pressure 625. For example, the speaker 330-1 in the first state may output an audio signal with relatively large sound pressure at the first frequency 620 by having the first frequency 620 as the resonant frequency.

For example, the speaker 330 may be burned-in (or aged or broken-in) in accordance with outputting the first audio signal. For example, a state of the speaker 330 may change from the first state to a second state as the speaker 330 is burned-in (or aged or broken-in).

For example, maximum sound pressure of an audio signal that may be output through a speaker 330-2 in the second state after the first audio signal is output may be represented as a line 630. For example, the maximum sound pressure of the audio signal that may be output through the speaker 330-2 in the second state may be indicated as second sound pressure 640 at a second frequency 635. For example, the second sound pressure 640 may be a maximum value of the maximum sound pressure of the audio signal that may be output through the speaker 330-2 in the second state. For example, the speaker 330-2 in the second state may have the second frequency 635 as a resonant frequency by having the maximum sound pressure of the audio signal that may be output at the second frequency 635 as the second sound pressure 640. For example, the speaker 330-2 in the second state may output an audio signal with relatively large sound pressure at the second frequency 635 by having the second frequency 635 as the resonant frequency.

For example, the second frequency 635 may be as low as a difference 645 between the second frequency 635 and the first frequency 620 with respect to the first frequency 620. For example, a resonant frequency of the speaker 330 may be lowered as the speaker 330 changes from the first frequency 620 to the second frequency 635, due to the speaker 330 being burned-in (or aged, or broken-in). For example, the speaker 330-2 (or burned-in speaker) in the second state may output audio data with relatively large sound pressure on the second frequency 635 lower than the first frequency 620. For example, at least one processor 310 may output audio data on a relatively low frequency band with relatively large sound pressure by burning-in (or aging or braking-in) the speaker 330. For example, the at least one processor 310 may effectively notify an emergency state of a user by outputting an audio signal through the burned-in (or aged, or broken-in) speaker 330.

Referring again to FIG. 5A, the at least one processor 310 may output the second audio signal 530-1 through the burned-in (or aged, or broken-in) speaker (e.g., the speaker 330-2 in the second state of FIG. 6) after outputting the first audio signal 515-1. For example, the second audio signal 530-1 may be output with the second sound pressure 535, which is greater than the first sound pressure 520. For example, the second sound pressure 535 may correspond to full-scale sound pressure. For example, the at least one processor 310 may output the second audio signal 530-1 with the second sound pressure 535 corresponding to the full-scale sound pressure to effectively notify the emergency state of the user.

For example, the second audio signal 530-1 may be output on a second frequency range having audible sensitivity higher than audible sensitivity of the first frequency range of the first audio signal 515-1. For example, the second frequency range may be defined as a frequency range output with the largest sound pressure among frequency ranges in which the second audio signal 530-1 is output. For example, a frequency range with high audible sensitivity may be defined as a frequency range (e.g., a frequency range of 3 kilohertz (kHz) to 4 kHz) of audio that sounds effectively to a human car. For example, since the speaker 330 is burned-in (or aged or broken-in) according to the output of the first audio signal 515-1, the burned-in speaker may have the second resonant frequency (e.g., the second resonant frequency 635 of FIG. 6). For example, since the burned-in speaker has the second resonant frequency, the burned-in speaker may output an audio signal with relatively large sound pressure on the second frequency range having relatively high audible sensitivity. For example, the at least one processor 310 may effectively notify the emergency state of the user by outputting the second audio signal 530-1 through the burned-in speaker.

For example, the at least one processor 310 may effectively notify the emergency state of the user even when the second audio signal 530-1 is output during a relatively short second time interval 540 by outputting the second audio signal 530-1 with relatively large sound pressure on the second frequency range having the relatively high audible sensitivity. For example, since the at least one processor 310 outputs the second audio signal 530-1 during the relatively short second time interval 540, relatively low heat generation of the speaker 330 may be generated. For example, since the relatively low heat generation of the speaker 330 is generated, damage to the speaker 330 may be reduced or discomfort of the user may be eliminated. For example, since the relatively low heat generation of the speaker 330 is generated, a battery of a wearable device 300 may be discharged relatively slowly.

For example, the at least one processor 310 may cease (or refrain from, or not output) outputting an audio signal, or may output a third audio signal with third sound pressure smaller than the first sound pressure 520 after outputting the second audio signal 530-1 to reduce heat generation of the speaker 330. For example, according to relatively low heat generation, the at least one processor 310 may cease (or refrain from, or not output) outputting an audio signal during a third time interval 545 that is relatively shorter than the time interval 230 of FIG. 2, or may output the third audio signal with the third sound pressure smaller than the first sound pressure 520. For example, since the at least one processor 310 ceases (or refrain from, or not output) outputting an audio signal during the third time interval 545 that is relatively shorter than the time interval 230 of FIG. 2, or outputs the third audio signal with the third sound pressure smaller than the first sound pressure 520, the at least one processor 310 may effectively notify the emergency state of the user.

For example, the at least one processor 310 may output a fourth audio signal 515-2 through the speaker 330 as reference time elapses after outputting the second audio signal 530-1. For example, the fourth audio signal 515-2 may correspond to the first audio signal 515-1.

For example, the at least one processor 310 may output, through the burned-in (or aged or broken-in) speaker as the fourth audio signal 515-2 is output, the fifth audio signal 530-2 after outputting the fourth audio signal 515-2. For example, the fifth audio signal 530-2 may correspond to the second audio signal 530-1.

For example, the at least one processor 310 may repeatedly output the first audio signal 515-1 and the second audio signal 530-1 through the speaker 330 according to a designated period. For example, the first audio signal 515-1 and the second audio signal 530-1 may configure one section or one segment.

For example, the at least one processor 310 may repeatedly output the first audio signal 515-1, the second audio signal 530-1, and the third audio signal through the speaker 330 according to the designated period. For example, the designated period may include one period during a fourth time interval 550. For example, the at least one processor 310 may effectively notify the emergency state of the user by repeatedly outputting the first audio signal 515-1, the second audio signal 530-1, and the third audio signal through the speaker 330 according to the designated period. For example, the at least one processor 310 may effectively provide audio corresponding to an emergency siren by repeatedly outputting the first audio signal 515-1, the second audio signal 530-1, and the third audio signal through the speaker 330 according to the designated period.

For example, the at least one processor 310 may detect that the emergency state of the user ends while providing the audio corresponding to an emergency siren. For example, the at least one processor 310 may cease (or refrain from, or not output) outputting the first audio signal 515-1, the second audio signal 530-1, and/or the third audio signal based on the end of the emergency state.

Figure 5B:
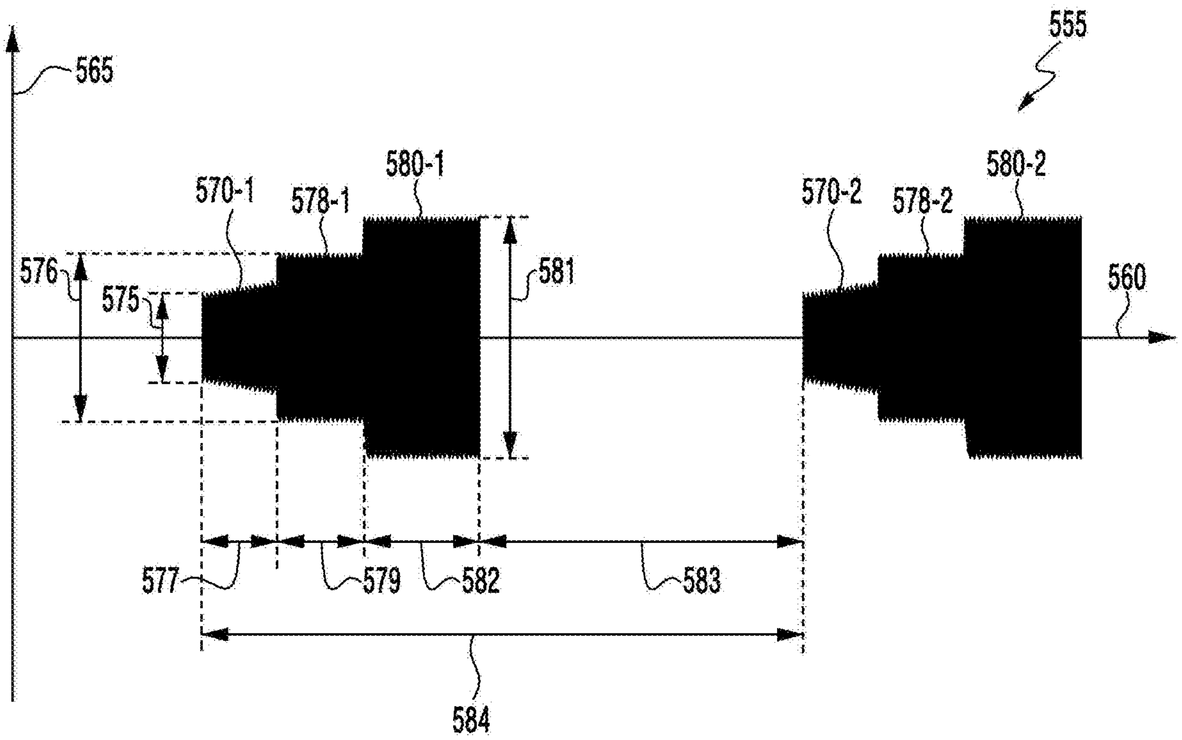
FIG. 5B is a diagram illustrating an example of audio signals corresponding to an emergency siren, according to various embodiments.

FIG. 5B is a diagram illustrating an example of audio signals corresponding to an emergency siren, according to various embodiments.

Referring to FIG. 5B, a chart 555 illustrates a change in sound pressure of audio signals (e.g., a first audio signal 570-1, a second audio signal 578-1, and a third audio signal 580-1) according to time. A horizontal axis 560 in the chart 555 indicates time, and a vertical axis 565 in the chart 555 indicates sound pressure of an audio signal.

For example, the sound pressure of the audio signal may be represented as a vertical length of an object corresponding to the audio signal in the chart 555.

For example, at least one processor 310 may output the first audio signal 570-1 through a speaker 330 to provide audio corresponding to an emergency siren based on an emergency state of a user (e.g., the user 110 of FIG. 1). For example, the first audio signal 570-1 may be output on a first frequency range. For example, the first frequency range may be defined as a frequency range output with the largest sound pressure among frequency ranges in which the first audio signal 570-1 is output. For example, the first audio signal 570-1 may be output in a sweep manner on the first frequency range.

For example, the at least one processor 310 may output the second audio signal 578-1 through the speaker 330 after outputting the first audio signal 570-1. For example, the second audio signal 578-1 may correspond to the first audio signal 515-1 of FIG. 5A. For example, the second audio signal 578-1 may be output on the first frequency range.

For example, the at least one processor 310 may output the first audio signal 570-1 and the second audio signal 578-1 to burn-in (or age or break-in) the speaker 330.

For example, the at least one processor 310 may output the first audio signal 570-1 and the second audio signal 578-1 during a relatively short first time interval 577 and a second time interval 579, by outputting the first audio signal 570-1 and the second audio signal 578-1 to burn-in (or age or break-in) the speaker 330. For example, the at least one processor 310 may output the first audio signal 570-1 and the second audio signal 578-1 with relatively small sound pressure, by outputting the first audio signal 570-1 and the second audio signal 578-1 to burn-in (or age or break-in) the speaker 330.

For example, the at least one processor 310 may output the first audio signal 570-1 with first sound pressure, which is relatively small sound pressure. For example, the first sound pressure may gradually increase in a range from second sound pressure 575 to third sound pressure 576. For example, the second sound pressure 575 may be smaller than the third sound pressure 576. For example, since the at least one processor 310 outputs the first audio signal 570-1 with the first sound pressure, which is the relatively small sound pressure, heat generation of the speaker 330 may be relatively low.

For example, the at least one processor 310 may output the second audio signal 578-1 with the third sound pressure 576, which is relatively small sound pressure. For example, since the at least one processor 310 outputs the second audio signal 578-1 with the third sound pressure 576, which is the relatively small sound pressure, heat generation of the speaker 330 may be relatively low.

For example, the at least one processor 310 may burn-in (or age or break-in) the speaker 330 by outputting the first audio signal 570-1 and the second audio signal 578-1. For example, the description of FIG. 6 may be referred to for burning-in (or aging or braking-in) the speaker 330.

For example, the at least one processor 310 may output the third audio signal 580-1 through a burned-in (or aged or broken-in) speaker (e.g., the speaker 330-2 in the second state of FIG. 6) after outputting the second audio signal 578-1. For example, the third audio signal 580-1 may correspond to the second audio signal 530-1 of FIG. 5A.

For example, the third audio signal 580-1 may be output with fourth sound pressure 581, which is greater than the third sound pressure 576. For example, the fourth sound pressure 581 may correspond to full-scale sound pressure. For example, the at least one processor 310 may output the third audio signal 580-1 with the fourth sound pressure 581 corresponding to the full-scale sound pressure to effectively notify the emergency state of the user.

For example, the third audio signal 580-1 may be output on a second frequency range having audible sensitivity higher than audible sensitivity of the first frequency range of the first audio signal 570-1 and the second audio signal 578-1. For example, the second frequency range may be defined as a frequency range output with the largest sound pressure among frequency ranges in which the third audio signal 580-1 is output. For example, a frequency range with high audible sensitivity may be defined as a frequency range (e.g., a frequency range of 3 kilohertz (kHz) to 4 kHz) of audio that sounds effectively to a human car. For example, since the speaker 330 is burned-in (or aged or broken-in) according to the output of the first audio signal 570-1 and the second audio signal 578-1, the burned-in speaker may have a second resonant frequency (e.g., the second resonant frequency 635 of FIG. 6). For example, since the burned-in speaker has the second resonant frequency, the burned-in speaker may output an audio signal with relatively large sound pressure on the second frequency range having the relatively high audible sensitivity. For example, the at least one processor 310 may effectively notify the emergency state of the user by outputting the third audio signal 580-1 through the burned-in speaker.

For example, the at least one processor 310 may effectively notify the emergency state of the user even when the third audio signal 580-1 is output during a relatively short third time interval 582 by outputting the third audio signal 580-1 with relatively large sound pressure on the second frequency range having the relatively high audible sensitivity. For example, since the at least one processor 310 outputs the third audio signal 580-1 during the relatively short third time interval 582, relatively low heat generation of the speaker 330 may be generated. For example, since the relatively low heat generation of the speaker 330 is generated, damage to the speaker 330 may be reduced or discomfort of the user may be eliminated. For example, since the relatively low heat generation of the speaker 330 is generated, a battery of a wearable device 300 may be discharged relatively slowly.

For example, the at least one processor 310 may cease (or refrain from, or not output) outputting an audio signal, or may output a fourth audio signal with fifth sound pressure smaller than the third sound pressure 576 after outputting the third audio signal 580-1 to reduce heat generation of the speaker 330. For example, according to relatively low heat generation, the at least one processor 310 may cease (or refrain from, or not output) outputting an audio signal during a fourth time interval 583 that is relatively shorter than the time interval 230 of FIG. 2, or may output the fourth audio signal with the fifth sound pressure smaller than the third sound pressure 576. For example, since the at least one processor 310 ceases (or refrain from, or not output) outputting an audio signal during the fourth time interval 583 that is relatively shorter than the time interval 230 of FIG. 2, or outputs the fourth audio signal with the fifth sound pressure smaller than the third sound pressure 576, the at least one processor 310 may effectively notify the emergency state of the user.

For example, the at least one processor 310 may output a fifth audio signal 570-2 through the speaker 330 as reference time elapses after outputting the third audio signal 580-1. For example, the fifth audio signal 570-2 may correspond to the first audio signal 570-1. For example, the at least one processor 310 may output a sixth audio signal 578-2 through the speaker 330 after outputting the fifth audio signal 570-1. For example, the sixth audio signal 578-2 may correspond to the second audio signal 578-1.

| For example, the at least one processor 310 may output a seventh audio signal 580-2 through the burned-in (or aged or broken-in) speaker as the seventh audio signal 580-2 is output after outputting the sixth audio signal 578-2. For example, the seventh audio signal 580-2 may correspond to the third audio signal 580-1.

For example, the at least one processor 310 may repeatedly output the first audio signal 570-1, the second audio signal 578-1, and the third audio signal 580-1 through the speaker 330 according to a designated period. For example, the first audio signal 570-1, the second audio signal 578-1, and the third audio signal 580-1 may configure one section or one segment.

For example, the at least one processor 310 may repeatedly output the first audio signal 570-1, the second audio signal 578-1, the third audio signal 580-1, and the fourth audio signal through the speaker 330 according to the designated period. For example, the designated period may include one period during a fifth time interval 584. For example, the at least one processor 310 may effectively notify the emergency state of the user by repeatedly outputting the first audio signal 570-1, the second audio signal 578-1, the third audio signal 580-1, and the fourth audio signal through the speaker 330 according to the designated period. For example, the at least one processor 310 may effectively provide the audio corresponding to an emergency siren by repeatedly outputting the first audio signal 570-1, the second audio signal 578-1, the third audio signal 580-1, and the fourth audio signal through the speaker 330 according to the designated period.

For example, the at least one processor 310 may detect that the emergency state of the user ends while providing the audio corresponding to an emergency siren. For example, the at least one processor 310 may cease (or refrain from or not output) outputting the first audio signal 570-1, the second audio signal 578-1, the third audio signal 580-1, and/or the fourth audio signal based on the end of the emergency state.

Figure 7A:
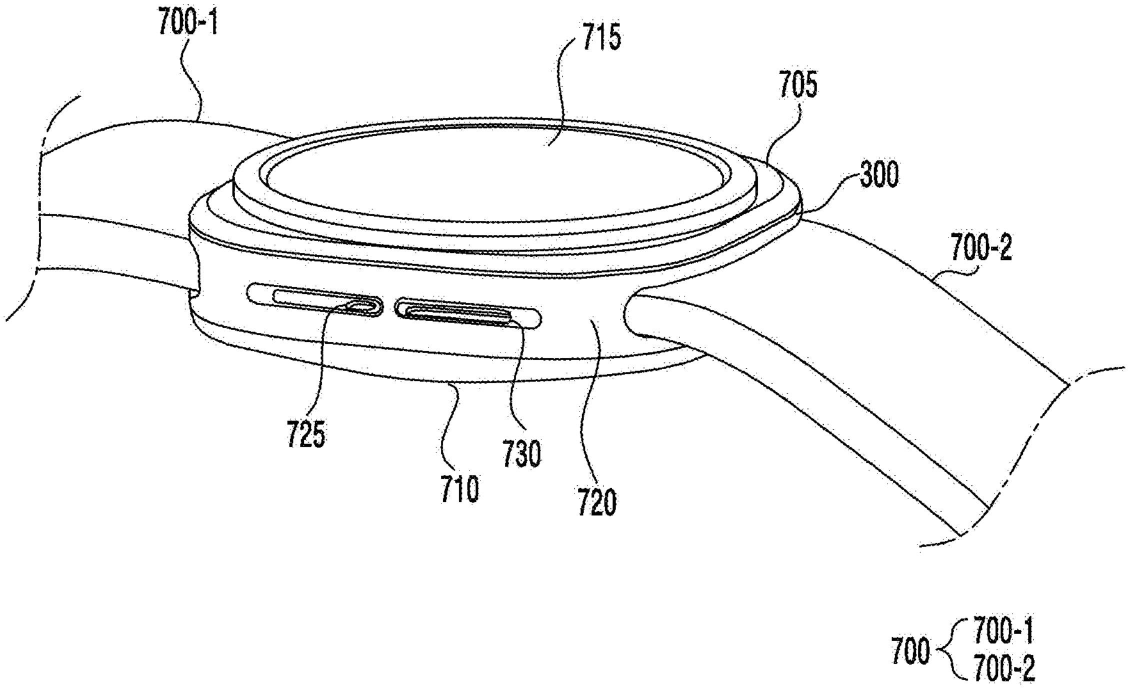
FIG. 7A is a perspective view illustrating an example of a speaker positioned in a wearable device according to various embodiments.

FIG. 7A is a perspective view of an example wearable electronic device illustrating an example of a speaker positioned in the wearable device according to various embodiments.

Referring to FIG. 7A, a wearable device 300 may further include a display 715, a housing, and a wrist-wearable structure 700 detachably coupled to the housing.

For example, the wrist-wearable structure 700 may include a first part 700-1. For example, the wrist-wearable structure 700 may include the first part 700-1 of the detachable wrist-wearable structure 700 and a second part 700-2 of the detachable wrist-wearable structure 700.

For example, the housing may include a front side 705 disposed under the display 715. For example, the housing may include a lateral side 720. For example, the lateral side 720 of the housing may include a first portion detachably coupled to the first part 700-1 of the wrist-wearable structure 700. For example, the lateral side 720 of the housing may include a second portion opposite the first portion of the housing and detachably coupled to the second part 700-2 of the wrist-wearable structure 700. For example, the lateral side 720 of the housing may include a third portion between the first portion of the housing and the second portion of the housing. For example, the lateral side 720 of the housing may include a fourth portion opposite the third portion and between the first portion of the housing and the second portion of the housing. For example, the housing may include a rear side 710 in contact with a wrist of a user wearing the wearable device 300.

For example, the third portion of the housing may include a first speaker hole 730 having a first size and a second speaker hole 725 spaced apart from the first speaker hole 730 and having a second size smaller than the first size. For example, the first speaker hole 730 and the second speaker hole 725 may be arranged side by side in the third portion of the housing.

For example, the housing may be aligned with an acoustic duct (or an acoustic path) between a speaker 330 and the second speaker hole 725, and an audio signal from the speaker 330 may be output through the acoustic duct and the second speaker hole 725.

For example, the wearable device 300 may include amplification circuitry (or a codec). For example, the amplification circuitry may be included in a power management integrated circuitry (PMIC) in the wearable device 300. For example, the speaker 330 may be configured to amplify an audio signal generated by digital to analog converter (DAC) circuitry in the PMIC of the wearable device 300.

Figure 7B:
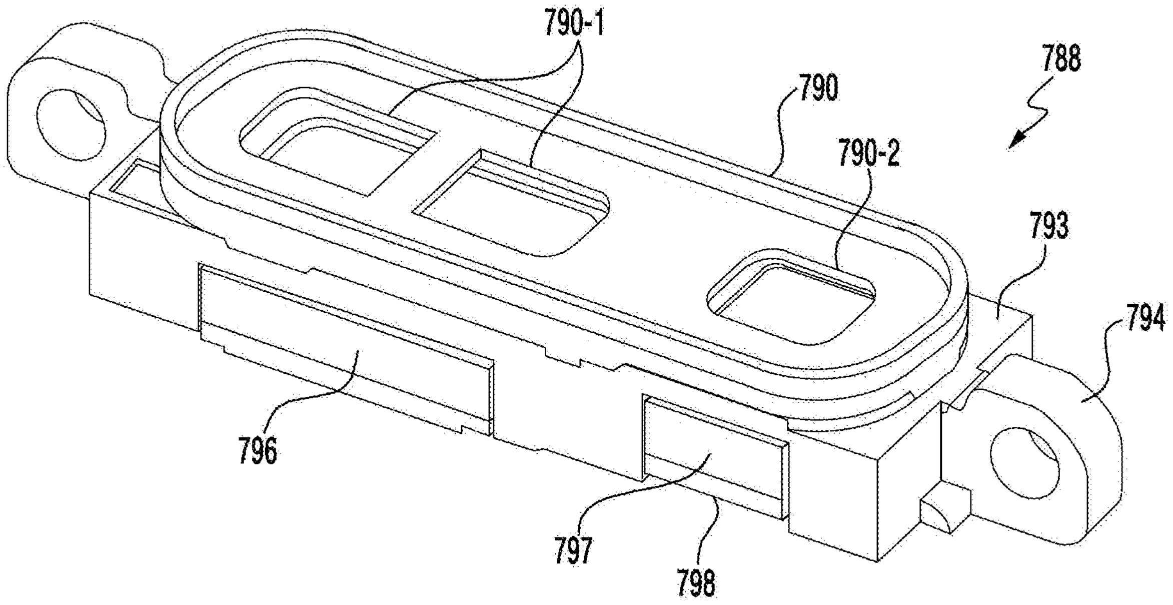
FIG. 7B is a perspective view illustrating an example speaker structure including a first speaker and a second speaker according to various embodiments.

FIG. 7B is a perspective view illustrating an example speaker structure including a first speaker and a second speaker according to various embodiments.

Figure 7C:
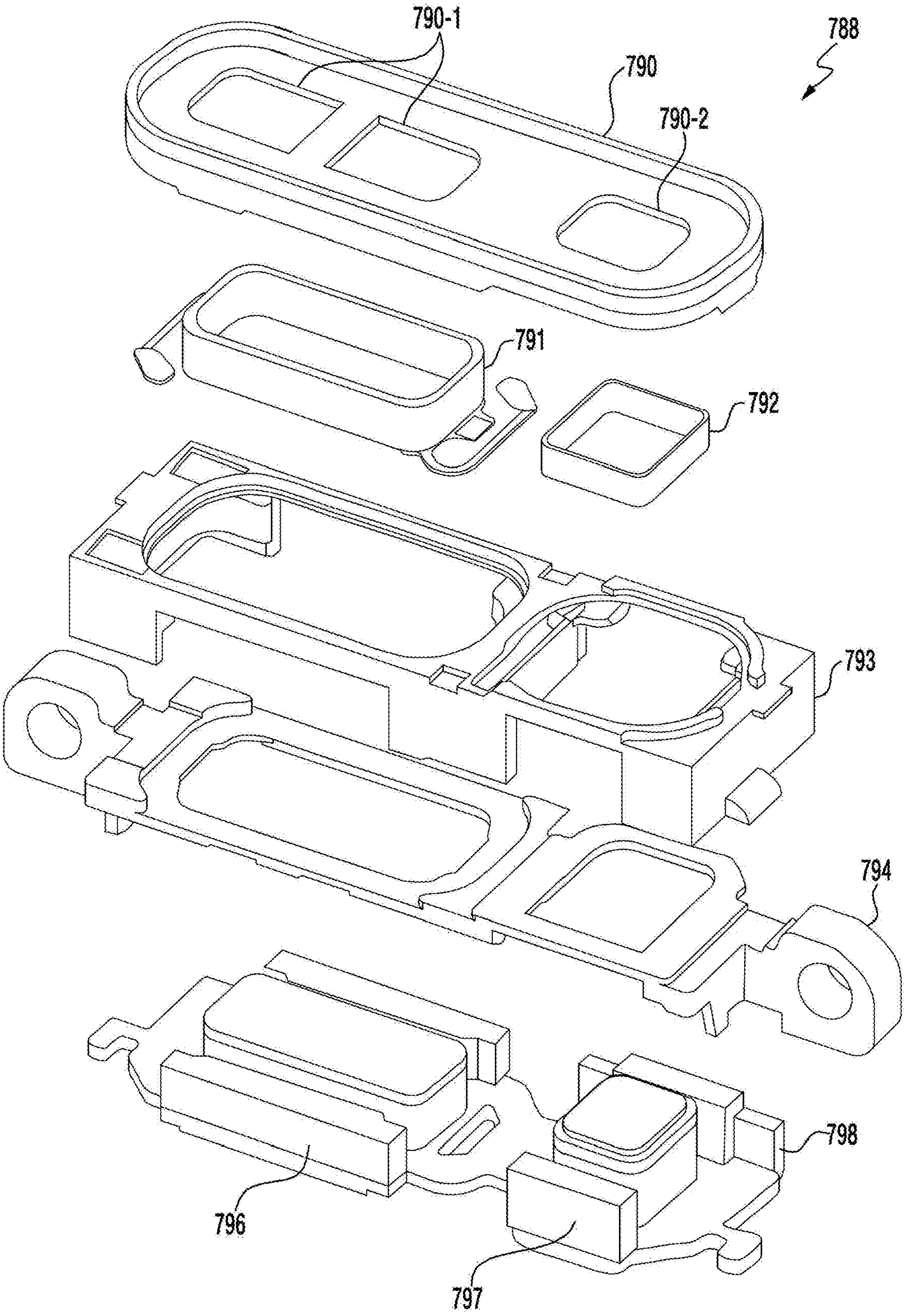
FIG. 7C is an exploded perspective view illustrating an example speaker structure including a first speaker and a second speaker according to various embodiments.

FIG. 7C is an exploded perspective view illustrating an example speaker structure including a first speaker and a second speaker according to various embodiments.

Referring to FIGS. 7B and 7C, a speaker structure 788 may include a diaphragm assembly 790, a first coil 791, a second coil 792, a frame 793, a connection structure 794, a first magnet 796, a second magnet 797, and a yoke 798.

The first magnet 796 and the second magnet 797 may be disposed on the yoke 798 (or attached to the yoke 798). For example, the yoke 798 may secure a magnet and collect a force of a magnetic field generated by the first magnet 796 and the second magnet 797 to increase an output and/or efficiency of a speaker.

For example, the first magnet 796 may be at least partially surrounded by the first coil 791. For example, the first coil 791 may laterally surround the first magnet 796. For example, the first coil 791 may surround the first magnet 796 when viewed from above. As a non-limiting example, the first coil 791 may be spaced apart from the first magnet 796. As a non-limiting example, the first coil 791 may be in substantial contact with the first magnet 796. For example, the second magnet 797 may be at least partially surrounded by the second coil 792. For example, the second coil 792 may laterally surround the second magnet 797. For example, the second coil 792 may surround the second magnet 797 when viewed from above. As a non-limiting example, the second coil 792 may be spaced apart from the second magnet 797. As a non-limiting example, the second coil 792 may be in substantial contact with the second magnet 797. For example, the first coil 791 may vibrate by a magnetic field formed by the speaker structure 788 by interacting with the first magnet 796. For example, the second coil 792 may vibrate by the magnetic field formed by the speaker structure 788 by interacting with the second magnet 797.

The frame 793 may be used to mount the diaphragm assembly 790, the first coil 791, the second coil 792, the first magnet 796, the second magnet 797, and the yoke 798. The frame 793 may be described as a speaker housing. A shape and a size of a first portion of the frame 793 may correspond to a shape and a size of the diaphragm assembly 790. A shape and a size of a second portion of the frame 793 may correspond to a shape and a size of the first coil 791. A shape and a size of a third portion of the frame 793 may correspond to a shape and a size of the second coil 792. A shape and a size of a fourth portion of the frame 793 may correspond to a shape and a size of the first magnet 796. A shape and a size of a fifth portion of the frame 793 may correspond to a shape and a size of the second magnet 797. A shape and a size of a sixth portion of the frame 793 may correspond to a shape and a size of the yoke 798. The frame 793 may form at least a portion of an exterior of the speaker structure 788 and may support the diaphragm assembly 790.

The connection structure 794 may be used to couple or connect the speaker structure 788 to the housing of a wearable device 300. The connection structure 794 may be disposed or positioned between the frame 793 and the yoke 798.

The diaphragm assembly 790 may be disposed on a top portion (or a front portion) of the frame 793. The diaphragm assembly 790 may include a diaphragm 790-1 arranged in relation to the first coil 791 surrounding the first magnet 796. The diaphragm 790-1 may be disposed on (or above) the first coil 791 surrounding the first magnet 796. The diaphragm assembly 790 may include a diaphragm 790-2 arranged in relation to the second coil 792 surrounding the second magnet 797. The diaphragm 790-2 may be disposed on (or above) the second coil 792 surrounding the second magnet 797. For example, the diaphragm 790-1 and/or the diaphragm 790-2 may be configured to vibrate based on vibration of the first coil 791 and the second coil 792. For example, as the diaphragm 790-1 and/or the diaphragm 790-2 vibrate, audio may be output from a speaker. As a non-limiting example, the vibration of the diaphragm 790-1 may be independent of the vibration of the diaphragm 790-2.

For example, at least one processor 310 may output audio corresponding to an emergency siren through a speaker 330 based on the vibration of the diaphragm 790-2.

Figure 8:
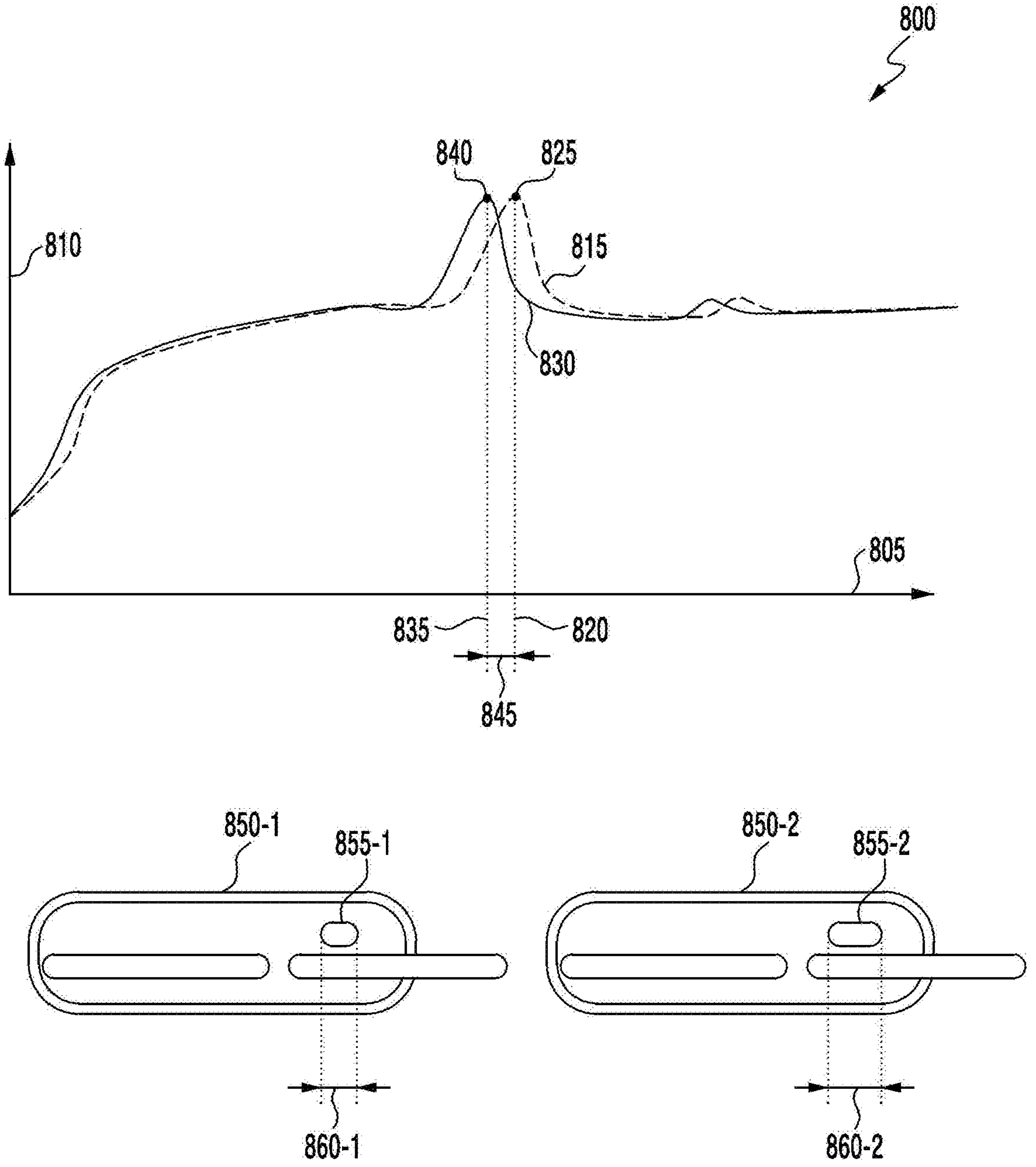
FIG. 8 is a diagram including a graph illustrating an example of a resonant frequency of a speaker according to a length of an acoustic path of the speaker according to various embodiments.

FIG. 8 includes diagrams illustrating an example of a resonant frequency of a speaker according to a length of an acoustic path of the speaker according to various embodiments.

Referring to FIG. 8, a chart 800 represents a change in maximum sound pressure of an audio signal that may be output through a speaker 330 according to a frequency. A horizontal axis 805 in the chart 800 indicates a frequency of an audio signal, and a vertical axis 810 in the chart 800 indicates the maximum sound pressure of the audio signal that may be output through the speaker 330.

For example, the speaker 330 may include a first speaker 850-1 and/or a second speaker 850-2. For example, the first speaker 850-1 may include a first acoustic path (or acoustic duct or acoustic pipeline) 855-1 of a first length 860-1.

For example, maximum sound pressure of an audio signal that may be output through the first speaker 850-1 may be represented as a line 830. For example, the maximum sound pressure of the audio signal that may be output through the first speaker 850-1 may be indicated as first sound pressure 840 at a first frequency 835. For example, the first sound pressure 840 may be a maximum value of the maximum sound pressure of the audio signal that may be output through the first speaker 850-1. For example, the first speaker 850-1 may have the first frequency 835 as a resonant frequency by having the maximum sound pressure of the audio signal that may be output at the first frequency 835 as the first sound pressure 840. For example, the first speaker 850-1 may output the audio signal with relatively large sound pressure at the first frequency 835 by having the first frequency 835 as the resonant frequency.

For example, the second speaker 850-2 may include a second acoustic path (or acoustic duct or acoustic pipeline) 855-2 of a second length 860-2. For example, the second length 860-2 may be longer than the first length 860-1.

For example, maximum sound pressure of an audio signal that may be output through the second speaker 850-2 may be represented as a line 815. For example, the maximum sound pressure of the audio signal that may be output through the second speaker 850-2 may be indicated as second sound pressure 825 at a second frequency 820. For example, the second sound pressure 825 may be a maximum value of the maximum sound pressure of the audio signal that may be output through the second speaker 850-2. For example, the second speaker 850-2 may have the second frequency 820 as a resonant frequency by having the maximum sound pressure of the audio signal that may be output at the second frequency 820 as the second sound pressure 825. For example, the second speaker 850-2 may output the audio signal with relatively large sound pressure at the second frequency 820 by having the second frequency 820 as the resonant frequency.

For example, the first frequency 835 may be as low as a difference 845 between the first frequency 835 and the second frequency 820 with respect to the second frequency 820. For example, a resonant frequency of the speaker 330 may be lowered as the speaker 330 has an acoustic path (or acoustic duct or acoustic pipeline) of the speaker 330 of a relatively short length. For example, the first speaker 850-1 having the relatively short first length 860-1 of the acoustic path 855-1 may output audio data with relatively large sound pressure than the second speaker 850-2 having the relatively long second length 860-2 of the acoustic path 855-2 in the first frequency 835 band lower than the second frequency 820. For example, at least one processor 310 may output audio data with relatively large sound pressure in a relatively low frequency band through the first speaker 850-1 having the relatively short first length 860-1 of the acoustic path 855-1. For example, the at least one processor 310 may effectively notify an emergency state of a user by outputting an audio signal through the first speaker 850-1 having the relatively short first length 860-1 of the acoustic path 855-1.

Figure 9A:
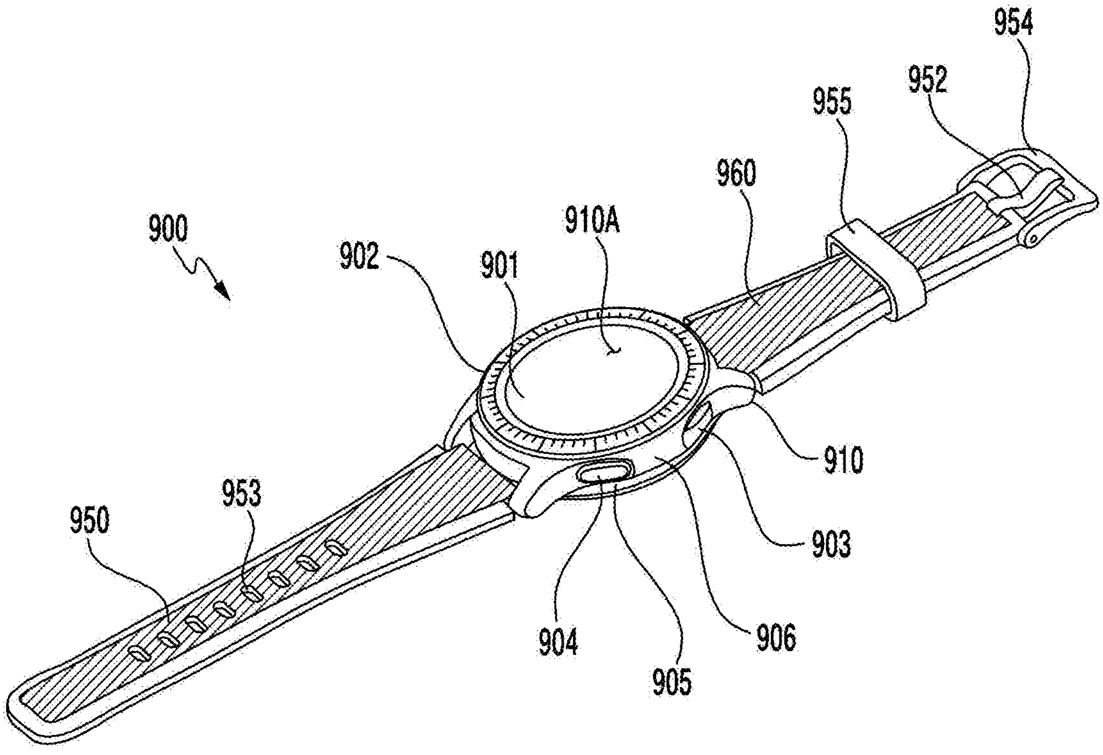
FIGS. 9A and 9B are front and rear perspective views, respectively, illustrating an example electronic device, according to various embodiments.
Figure 9B:
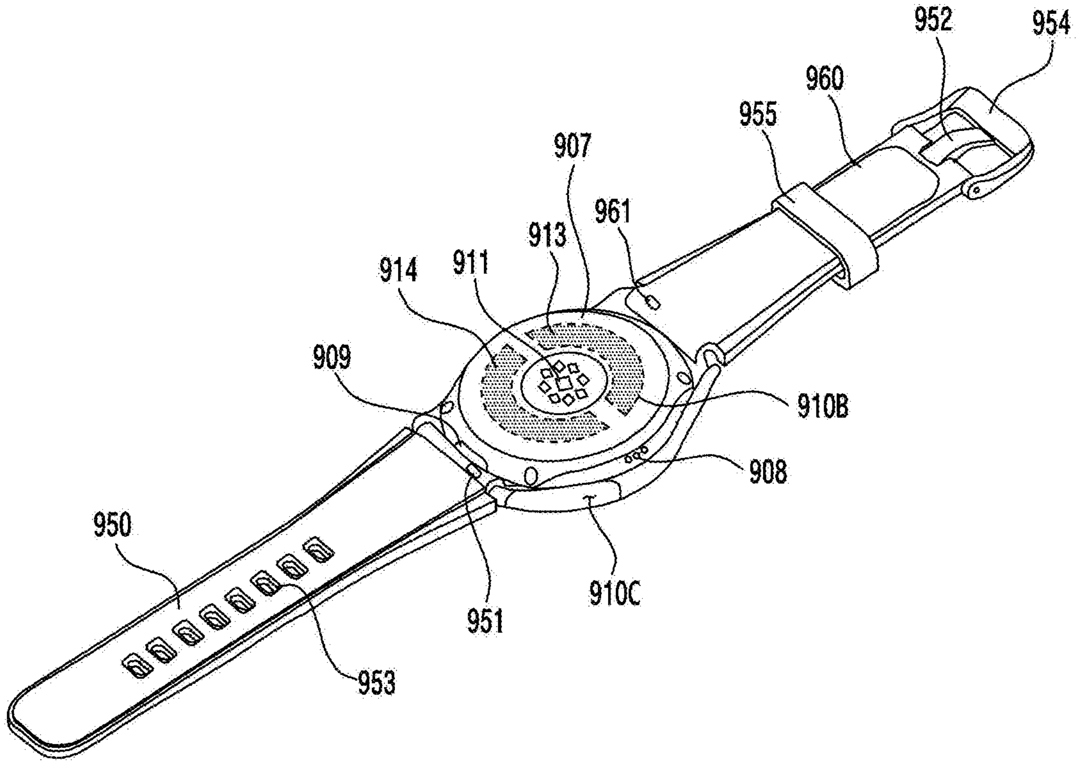

FIGS. 9A and 9B are front and rear perspective views, respectively, of an example electronic device, according to various embodiments.

Referring to FIGS. 9A and 9B, an electronic device 900 (e.g., the wearable device 300 of FIG. 3) according to an embodiment may include a housing 910 including a first surface (or front surface) 910A, a second surface (or rear surface) 910B, and a lateral surface 910C surrounding a space between the first surface 910A and the second surface 910B, and attachment members 950 and 960 connected to at least a portion of the housing 910 and configured to detachably attach the electronic device 900 to a part (e.g., wrist or ankle) of a body of a user. In an embodiment (not shown), the housing may refer to a structure forming a portion of the first surfaced 910A, the second surface 910B, and the lateral surface 910C of FIGS. 9A and 9B. According to an embodiment, at least a portion of the first surface 910A may be formed by a substantially transparent front plate 901 (e.g., a glass plate or a polymer plate including various coating layers). The second surface 910B may be formed by a substantially opaque rear plate 907. The rear plate 907 may be formed by, for example, coated or colored glass, ceramic, polymer, metal (e.g., aluminum, stainless steel (STS), or magnesium), or a combination of at least two of the materials. The lateral surface 910C may be coupled to the front plate 901 and the rear plate 907 and may be formed by a lateral bezel structure (or "a lateral member") 906 including metal and/or polymer. In various embodiments, the rear plate 907 and the lateral bezel structure 906 may be integrally formed and include the same material (e.g., a metallic material such as aluminum). The attachment members 950 and 960 may be formed of various materials and shapes. By woven fabric, leather, rubber, urethane, metal, ceramic, or a combination of at least two of the materials, integral and a plurality of unit links may be formed to be movable with each other.

According to an embodiment, the electronic device 900 may include at least one or more of a display 920 (refer to FIG. 10), audio modules 905 and 908, a sensor module 911, key input devices 902, 903, and 904, and a connector hole 909. In various embodiments, the electronic device 900 may omit at least one of components (e.g., the key input devices 902, 903, and 904, the connector hole 909, or the sensor module 911), or may additionally include another component.

The display 920 may be visible, for example, through a significant portion of the front plate 901. A shape of the display 920 may be a shape corresponding to a shape of the front plate 901, and may be various shapes such as a circle, an oval, or a polygon. The display 920 may be coupled to or disposed adjacent to touch sensing circuitry, a pressure sensor capable of measuring an intensity (pressure) of a touch, and/or a fingerprint sensor.

The audio modules 905 and 908 may include a microphone hole 905 and a speaker hole 908. In the microphone hole 905, a microphone for obtaining external sound may be disposed inside it, and in various embodiments, a plurality of microphones may be disposed to detect a direction of sound. The speaker hole 908 may be used as an external speaker and a call receiver. In various embodiments, the speaker hole 908 and the microphone hole 905 may be implemented as one hole, or a speaker may be included without the speaker hole 908 (e.g., a piezo speaker).

The sensor module 911 may generate an electrical signal or a data value corresponding to an operating state inside or an external environmental state of the electronic device 900. The sensor module 911 may include, for example, a biometric sensor module 911 (e.g., an HRM sensor) disposed in the second surface 910B of the housing 910. The electronic device 900 may further include at least one of a sensor module not illustrated, for example, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The sensor module 911 may include electrode regions 913 and 914 forming a portion of a surface of the electronic device 900 and biometric signal detection circuitry (not shown) electrically connected to the electrode regions 913 and 914. For example, the electrode regions 913 and 914 may include the first electrode region 913 and the second electrode region 914 disposed in the second surface 910B of the housing 910. The sensor module 911 may be configured such that the electrode regions 913 and 914 obtain an electrical signal from a part of the body of the user, and the biometric signal detection circuitry detects biometric information of the user based on the electrical signal.

The key input devices 902, 903, and 904 may include a wheel key 902 disposed in the first surface 910A of the housing 910 and rotatable in at least one direction, and/or side key buttons 903 and 904 disposed in the lateral surface 910C of the housing 910. A shape of the wheel key may have corresponding to a shape of the front plate 901. In an embodiment, the electronic device 900 may not include a portion or all of the key input devices 902, 903, and 904 described-above, and the key input devices 902, 903, and 904 that are not included may be implemented in another shape, such as a soft key, on the display 920.

The connector hole 909 may include another connector hole (not shown) that may accommodate a connector (e.g., a USB connector) for transmitting and receiving power and/or data with an external electronic device and a connector for transmitting and receiving an audio signal with the external electronic device. The electronic device 900 may further include, for example, a connector cover (not shown) covering at least a portion of the connector hole 909 and blocking an inflow of an external foreign material with respect to the connector hole.

The attachment members 950 and 960 may be detachably coupled to at least a partial region of the housing 910 using locking members 951 and 961. The attachment members 950 and 960 may include one or more of a fixing member 952, a fixing member fastening hole 953, a band guide member 954, and a band fixing ring 955.

The fixing member 952 may be configured to fix the housing 910 and the attachment members 950 and 960 to the part (e.g., wrist or ankle) of the body of the user. The fixing member fastening hole 953 may fix the housing 910 and the attachment members 950 and 960 to the part of the body of the user in response to the fixing member 952. The band guide member 954 may allow the attachment members 950 and 960 to be coupled in close contact with the part of the body of the user, by being configured to limit a movement range of the fixing member 952 when the fixing member 952 is fastened to the fixing member fastening hole 953. The band fixing ring 955 may limit a movement range of the attachment members 950 and 960 in a state in which the fixing member 952 and the fixing member fastening hole 953 are fastened.

Figure 10:
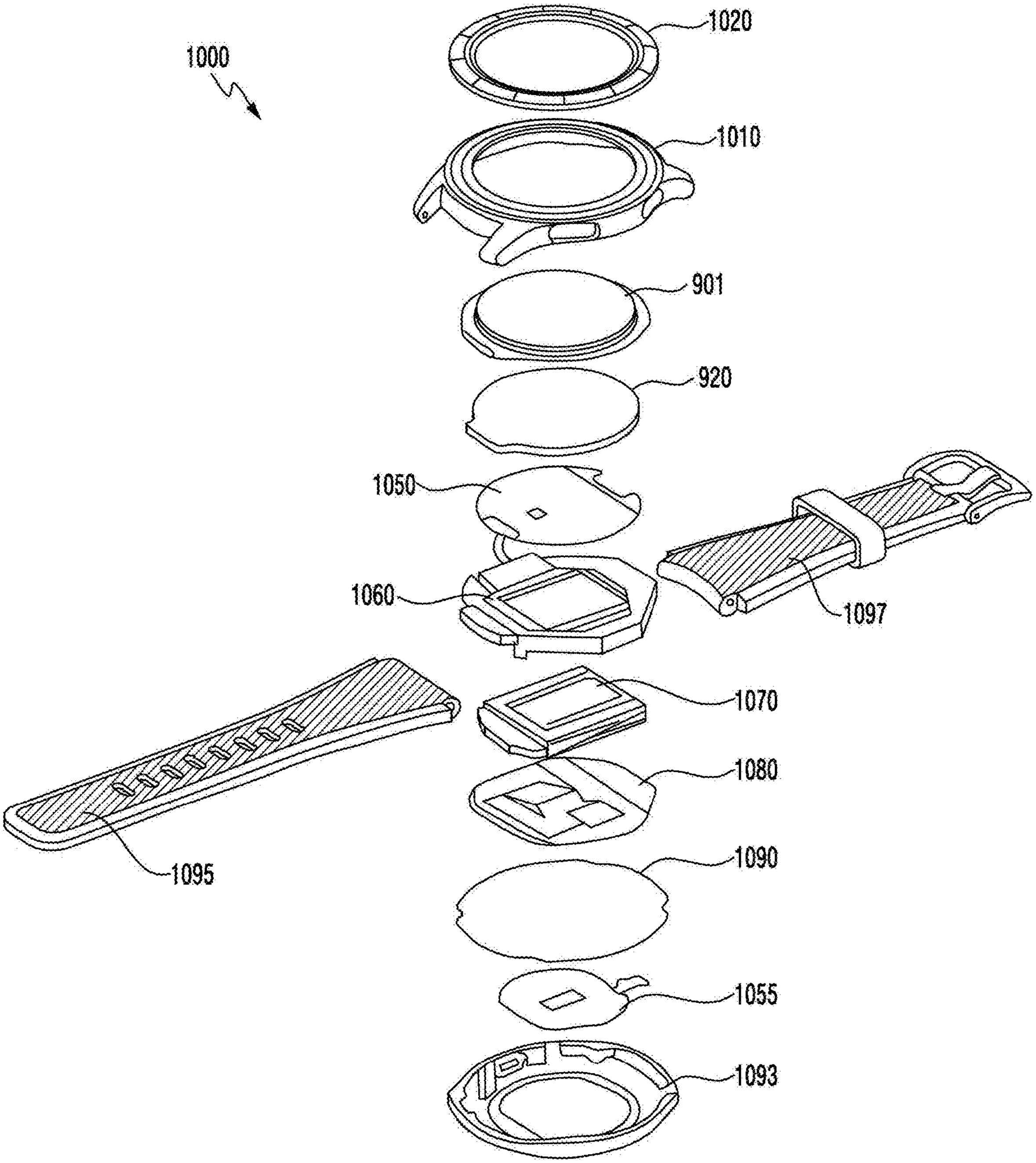
FIG. 10 is an exploded perspective view of an example electronic device according to various embodiments.

FIG. 10 is an exploded perspective view of an example electronic device according to various embodiments.

Referring to FIG. 10, an electronic device 1000 (e.g., the wearable device 300 of FIG. 3 or the electronic device 900 of FIGS. 9A to 9B) may include a lateral bezel structure 1010, a wheel key 1020 (e.g., the wheel key 902 of FIG. 9A), a front plate 901, a display 920, a first antenna 1050, a second antenna 1055, a support member 1060 (e.g., a bracket), a battery 1070, a printed circuit board 1080, a scaling member 1090, a rear plate 1093 (e.g., the rear plate 907 of FIG. 9B), and attachment members 1095 and 1097 (e.g., the attachment members 950 and 960 of FIG. 9B). At least one of components of the electronic device 1000 may be the same as or similar to at least one of the components of the wearable device 300 of FIG. 3 or the electronic device 900 of FIGS. 9A to 9B, and a redundant description will be omitted below. The support member 1060 may be connected to the lateral bezel structure 1010 or may be integrally formed with the lateral bezel structure 1010, by being disposed inside the electronic device 1000. The support member 1060 may be formed of, for example, a metal material and/or a non-metal (e.g., polymer) material. The display 920 may be coupled to a surface of the support member 1060, and the printed circuit board 1080 may be coupled to another surface. A processor, memory, and/or an interface may be mounted on the printed circuit board 1080. The processor may include, for example, one or more of a central processing unit, a graphic processing unit (GPU), an application processor, a sensor processor, or a communication processor.

The memory may include, for example, volatile memory or non-volatile memory. The interface may include, for example, a high definition multimedia interface (HDMI), a universal serial bus (USB) interface, an SD card interface, and/or an audio interface. The interface may, for example, electrically or physically connect the electronic device 1000 to an external electronic device, and may include a USB connector, an SD card/MMC connector, or an audio connector.

The battery 1070 is a device for supplying power to at least one component of the electronic device 1000, and may include, for example, a non-rechargeable primary battery, a rechargeable secondary battery, or a fuel cell. At least a portion of the battery 1070 may be disposed on substantially the same plane as the printed circuit board 1080, for example. The battery 1070 may be integrally disposed inside the electronic device 1000 or may be detachably disposed with the electronic device 1000.

The first antenna 1050 may be disposed between the display 920 and the support member 1060. The first antenna 1050 may include, for example, a near field communication (NFC) antenna, a wireless charging antenna, and/or a magnetic secure transmission (MST) antenna. For example, the first antenna 1050 may perform short-range communication or wirelessly transmit and receive power required for charging with an external device, and transmit a self-based signal including a short-range communication signal or payment data. In an embodiment, an antenna structure may be formed by a portion or a combination of the lateral bezel structure 1010 and/or the support member 1060.

The second antenna 1055 may be disposed between the printed circuit board 1080 and the rear plate 1093. The second antenna 1055 may include, for example, a near field communication (NFC) antenna, a wireless charging antenna, and/or a magnetic secure transmission (MST) antenna. For example, the second antenna 1055 may perform short-range communication or wirelessly transmit and receive power required for charging with the external device, and transmit a self-based signal including a short-range communication signal or payment data. In an embodiment, an antenna structure may be formed by a portion or a combination of the lateral bezel structure 1010 and/or the rear plate 1093.

The sealing member 1090 may be positioned between the lateral bezel structure 1010 and the rear plate 1093. The sealing member 1090 may be configured to block moisture and foreign matter flowing into a space surrounded by the lateral bezel structure 1010 and the rear plate 1093 from the outside.

Figure 11:
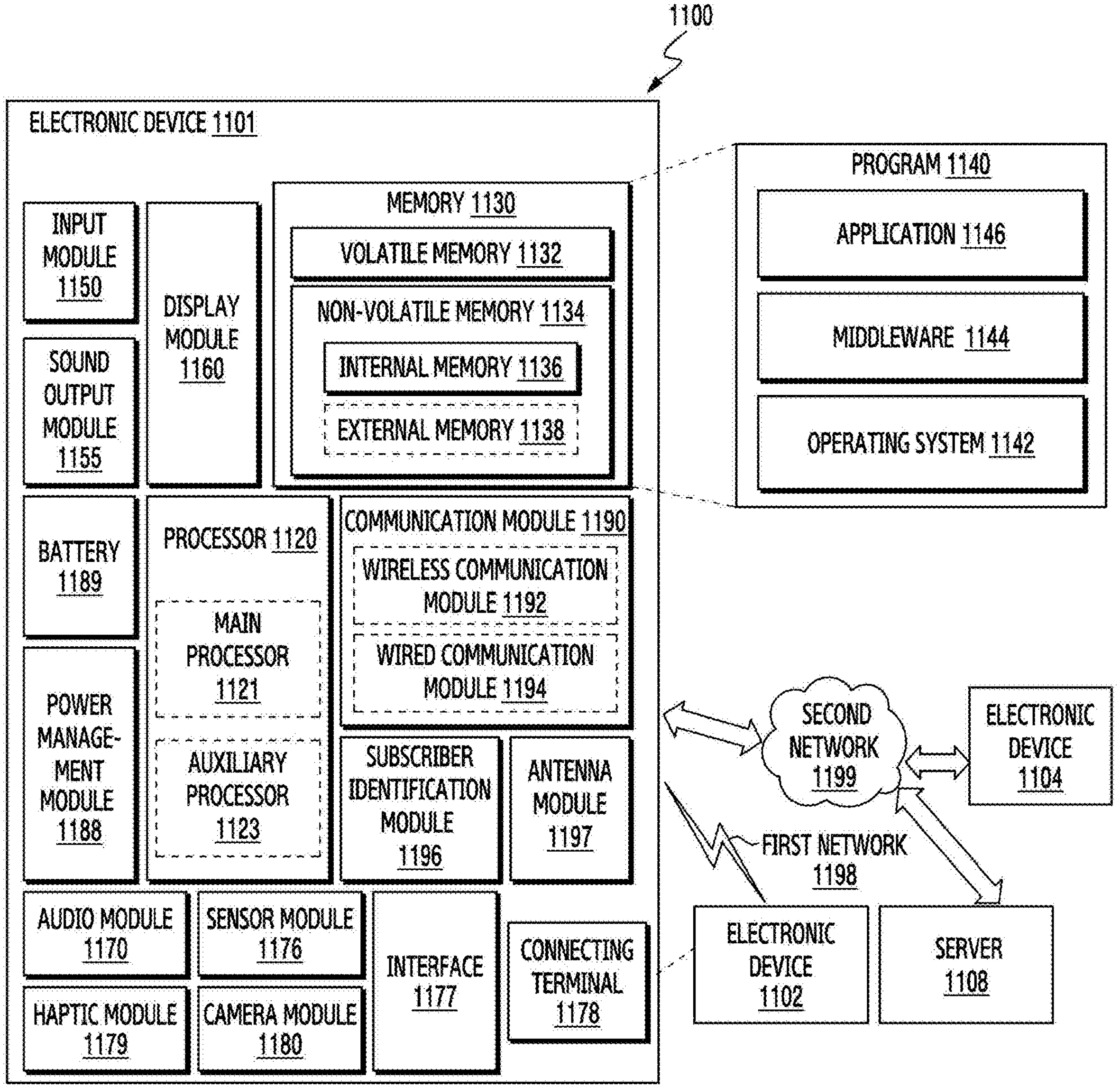
FIG. 11 is a block diagram illustrating an example electronic device in a network environment according to various embodiments.

FIG. 11 is a block diagram illustrating an electronic device 1101 in a network environment 1100 according to various embodiments.

Referring to FIG. 11, the electronic device 1101 in the network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In some embodiments, at least one of the components (e.g., the connecting terminal 1178) may be omitted from the electronic device 1101, or one or more other components may be added in the electronic device 1101. In some embodiments, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to an embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, an HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to an embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mm Wave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 1164 dB or less) for implementing mMTC, or U-plane latency (e.g., 0.5 ms or less for each of downlink (DL) and uplink (UL), or a round trip of 11 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In another embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 12:
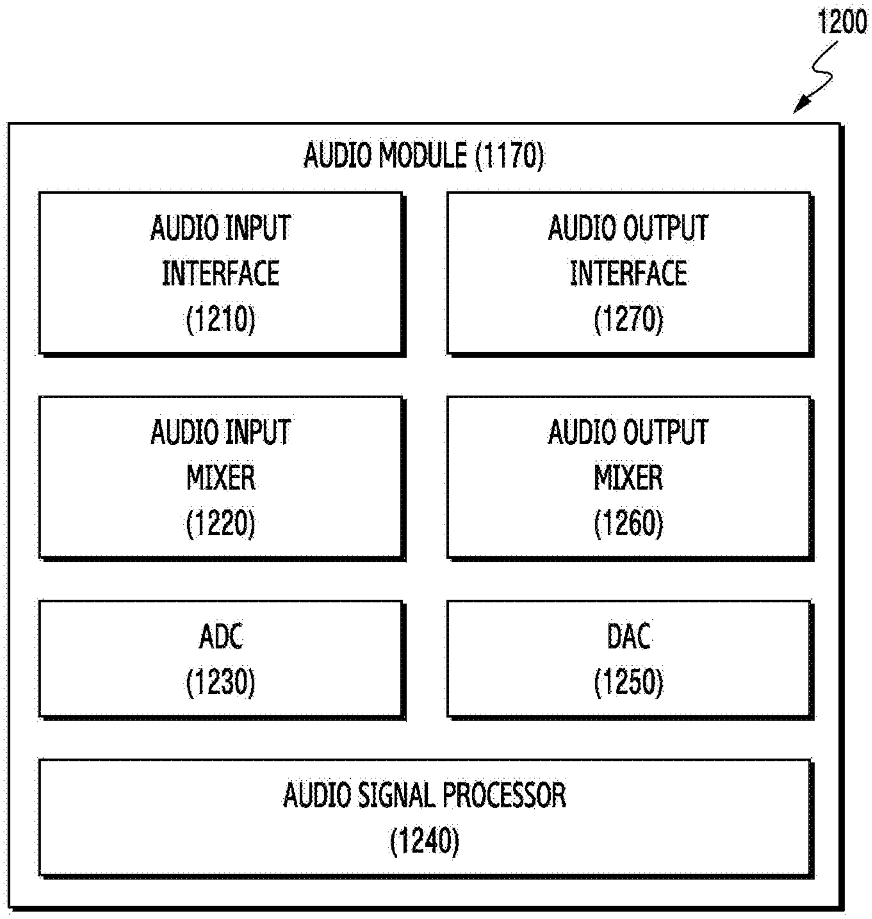
FIG. 12 is a block diagram illustrating an example configuration of an audio module according to various embodiments.

FIG. 12 is a block diagram illustrating an audio module according to various embodiments.

FIG. 12 is a block diagram 1200 illustrating the audio module 1170 according to various embodiments. Referring to FIG. 12, the audio module 1170 may include, for example, an audio input interface 1210, an audio input mixer 1220, an analog-to-digital converter (ADC) 1230, an audio signal processor 1240, a digital-to-analog converter (DAC) 1250, an audio output mixer 1260, or an audio output interface 1270.

The audio input interface 1210 may receive an audio signal corresponding to a sound obtained from the outside of the electronic device 1101 via a microphone (e.g., a dynamic microphone, a condenser microphone, or a piezo microphone) that is configured as part of the input module 1150 or separately from the electronic device 1101. For example, if an audio signal is obtained from the external electronic device 1102 (e.g., a headset or a microphone), the audio input interface 1210 may be connected with the external electronic device 1102 directly via the connecting terminal 1178, or wirelessly (e.g., Bluetooth™ communication) via the wireless communication module 1192 to receive the audio signal. According to an embodiment, the audio input interface 1210 may receive a control signal (e.g., a volume adjustment signal received via an input button) related to the audio signal obtained from the external electronic device 1102. The audio input interface 1210 may include a plurality of audio input channels and may receive a different audio signal via a corresponding one of the plurality of audio input channels, respectively. According to an embodiment, additionally or alternatively, the audio input interface 1210 may receive an audio signal from another component (e.g., the processor 1120 or the memory 1130) of the electronic device 1101.

The audio input mixer 1220 may synthesize a plurality of inputted audio signals into at least one audio signal. For example, according to an embodiment, the audio input mixer 1220 may synthesize a plurality of analog audio signals inputted via the audio input interface 1210 into at least one analog audio signal.

The ADC 1230 may convert an analog audio signal into a digital audio signal. For example, according to an embodiment, the ADC 1230 may convert an analog audio signal received via the audio input interface 1210 or, additionally or alternatively, an analog audio signal synthesized via the audio input mixer 1220 into a digital audio signal.

The audio signal processor 1240 may perform various processing on a digital audio signal received via the ADC 1230 or a digital audio signal received from another component of the electronic device 1101. For example, according to an embodiment, the audio signal processor 1240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 1240 may be implemented in the form of an equalizer.

The DAC 1250 may convert a digital audio signal into an analog audio signal. For example, according to an embodiment, the DAC 1250 may convert a digital audio signal processed by the audio signal processor 1240 or a digital audio signal obtained from another component (e.g., the processor (1120) or the memory (1130)) of the electronic device 1101 into an analog audio signal.

The audio output mixer 1260 may synthesize a plurality of audio signals, which are to be output, into at least one audio signal. For example, according to an embodiment, the audio output mixer 1260 may synthesize an analog audio signal converted by the DAC 1250 and another analog audio signal (e.g., an analog audio signal received via the audio input interface 1210) into at least one analog audio signal.

The audio output interface 1270 may output an analog audio signal converted by the DAC 1250 or, additionally or alternatively, an analog audio signal synthesized by the audio output mixer 1260 to the outside of the electronic device 1101 via the sound output module 1155. The sound output module 1155 may include, for example, a speaker, such as a dynamic driver or a balanced armature driver, or a receiver. According to an embodiment, the sound output module 1155 may include a plurality of speakers. In such a case, the audio output interface 1270 may output audio signals having a plurality of different channels (e.g., stereo channels or 5.1 channels) via at least some of the plurality of speakers. According to an embodiment, the audio output interface 1270 may be connected with the external electronic device 1102 (e.g., an external speaker or a headset) directly via the connecting terminal 1178 or wirelessly via the wireless communication module 1192 to output an audio signal.

According to an embodiment, the audio module 1170 may generate, without separately including the audio input mixer 1220 or the audio output mixer 1260, at least one digital audio signal by synthesizing a plurality of digital audio signals using at least one function of the audio signal processor 1240.

According to an embodiment, the audio module 1170 may include an audio amplifier (not shown) (e.g., a speaker amplifying circuit) that is capable of amplifying an analog audio signal inputted via the audio input interface 1210 or an audio signal that is to be output via the audio output interface 1270. According to an embodiment, the audio amplifier may be configured as a module separate from the audio module 1170.

As described above, according to an example embodiment, the wearable device (e.g., the wearable device 300 of FIG. 3) may comprise: memory (e.g., the memory 320 of FIG. 3), comprising one or more storage mediums, storing instructions, a speaker (e.g., the speaker 330 of FIG. 3), and at least one processor (e.g., the at least one processor 310 of FIG. 3) comprising processing circuitry. The instructions, when executed by the at least one processor individually or collectively, may cause the wearable device to detect a user's (e.g., the user 110 of FIG. 1) emergency state (e.g., the state 105 of FIG. 1). The instructions, when executed by the at least one processor individually or collectively, may cause the wearable device to, based on the emergency state, to provide audio corresponding to an emergency siren, output a first audio signal (e.g., the first audio signal 515-1 of FIG. 5A), through the speaker having a first resonant frequency, on a first frequency range with first sound pressure (e.g., the first sound pressure 520 of FIG. 5A). The instructions, when executed by the at least one processor individually or collectively, may cause the wearable device to, after outputting the first audio signal, output a second audio signal (e.g., the second audio signal 530-1 of FIG. 5A) through the speaker having a second resonant frequency on a second frequency range having audible sensitivity higher than audible sensitivity in the first frequency range with second sound pressure (e.g., the second sound pressure 535 of FIG. 5A) greater than the first sound pressure. Wherein a resonant frequency of the speaker may be changed from the first resonant frequency to the second resonant frequency lower than the first resonant frequency in accordance with outputting the first audio signal.

For example, the instructions, when executed by the at least one processor individually or collectively, may cause the wearable device to, after outputting the second audio signal, output a third audio signal with third sound pressure less than the first sound pressure.

For example, the instructions, when executed by the at least one processor individually or collectively, may cause the wearable device to, output the first audio signal through the speaker to burn-in the speaker. The instructions, when executed by the at least one processor individually or collectively, may cause the wearable device to, after outputting the first audio signal, output the second audio signal through the burned-in speaker. The resonant frequency of the speaker may be changed from the first resonant frequency to the second resonant frequency as the speaker is burned-in.

For example, the second sound pressure may include full-scale sound pressure.

For example, the instructions, when executed by the at least one processor individually or collectively, may cause the wearable device to, based on the emergency state, repeatedly output the first audio signal and the second audio signal according to a designated period to provide the audio corresponding to an emergency siren.

For example, the instructions, when executed by the at least one processor individually or collectively, may cause the wearable device to, based on the emergency state, repeatedly output the first audio signal, the second audio signal, and the third audio signal according to a designated period to provide the audio corresponding to an emergency siren.

For example, the instructions, when executed by the at least one processor individually or collectively, may cause the wearable device to, while providing the audio corresponding to an emergency siren, detect that the emergency state of the user is ended. The instructions, when executed by the at least one processor individually or collectively, may cause the wearable device to, based on the end of the emergency state, cease outputting the first audio signal and the second audio signal.

For example, the wearable device may further comprise a housing and a wrist-wearable structure comprising at least one strap detachably coupled to the housing. The wrist-wearable structure may comprise a first part, and a second part of the wrist-wearable structure detachable from the first part of the wrist-wearable structure. The housing may comprise a front side, a lateral side comprising: a first portion detachably coupled to the first part of the wrist-wearable structure, a second portion opposite the first portion of the housing and coupled to the second part of the wrist-wearable structure, a third portion between the first portion of the housing and the second portion of the housing, and a fourth portion opposite the third portion and between the first portion of the housing and the second portion of the housing, and a rear side configured to be in contact with a wrist of a user wearing the wearable device. The third portion of the housing may comprise a first speaker hole having a first size and a second speaker hole spaced apart from the first speaker hole and having a second size smaller than the first size. The housing may be aligned with an acoustic duct between the speaker and the second speaker hole. The electronic device may be configured to output the audio signal from the speaker through the acoustic duct and the second speaker hole.

For example, the speaker may be configured to amplify an audio signal generated by digital-to-analog converter (DAC) circuitry in power management integrated circuitry (PMIC) of the wearable device.

For example, the instructions, when executed by the at least one processor individually or collectively, may cause the wearable device to, based on the emergency state, to provide the audio corresponding to an emergency siren, output a third audio signal on the first frequency range through the speaker having the first resonant frequency with fourth sound pressure that increases within a range from third sound pressure less than the first sound pressure to the first sound pressure. The instructions, when executed by the at least one processor individually or collectively, may cause the wearable device to, after outputting the third audio signal, output the first audio signal.

As described above, according to an example embodiment, a method may be performed in a wearable device comprising a speaker. The method may comprise detecting a user's emergency state. The method may comprise, based on the emergency state, to provide audio corresponding to an emergency siren, outputting a first audio signal, through the speaker having a first resonant frequency, on a first frequency range with first sound pressure. The method may comprise, after outputting the first audio signal, outputting a second audio signal through the speaker having a second resonant frequency on a second frequency range having audible sensitivity higher than audible sensitivity in the first frequency range with second sound pressure greater than the first sound pressure Wherein the resonant frequency of the speaker may be changed from the first resonant frequency to the second resonant frequency lower than the first resonant frequency in accordance with outputting the first audio signal.

For example, the method may comprise, after outputting the second audio signal, outputting a third audio signal with third sound pressure less than the first sound pressure.

For example, the method may comprise outputting the first audio signal through the speaker to burn-in the speaker. The method may comprise, after outputting the first audio signal, outputting the second audio signal through the burned-in speaker Wherein the resonant frequency of the speaker may be changed from the first resonant frequency to the second resonant frequency as the speaker is burned-in.

For example, the second sound pressure may include full-scale sound pressure.

For example, the method may comprise, based on the emergency state, repeatedly outputting the first audio signal and the second audio signal according to a designated period to provide the audio corresponding to an emergency siren.

For example, the method may comprise, based on the emergency state, repeatedly outputting the first audio signal, the second audio signal, and the third audio signal according to a designated period to provide the audio corresponding to an emergency siren.

For example, the method may comprise: while providing the audio corresponding to an emergency siren, detecting that the emergency state of the user is ended. The method may comprise, based on the end of the emergency state, ceasing outputting the first audio signal and the second audio signal.

For example, the wearable device may further comprise: a housing and a wrist-wearable structure comprising a strap detachably coupled to the housing. The wrist-wearable structure may comprise a first part, and a second part of the wrist-wearable structure detachable from the first part of the wrist-wearable structure. The housing may comprise a front side, a lateral side comprising a first portion detachably coupled to the first part of the wrist-wearable structure, a second portion opposite the first portion of the housing and coupled to the second part of the wrist-wearable structure, a third portion between the first portion of the housing and the second portion of the housing, and a fourth portion opposite the third portion and between the first portion of the housing and the second portion of the housing, and a rear side configured to be in contact with a wrist of a user wearing the wearable device. The third portion of the housing may comprise a first speaker hole having a first size and a second speaker hole spaced apart from the first speaker hole and having a second size smaller than the first size. The housing may be aligned with an acoustic duct between the speaker and the second speaker hole. Wherein the wearable device may be configured to output the audio signal from the speaker through the acoustic duct and the second speaker hole.

For example, the method may comprise the speaker amplifying an audio signal generated by digital-to-analog converter (DAC) circuitry in power management integrated circuitry (PMIC) of the wearable device.

For example, the method may comprise, based on the emergency state, to provide the audio corresponding to an emergency siren, outputting a third audio signal on the first frequency range through the speaker having the first resonant frequency with fourth sound pressure that gradually increases within a range from third sound pressure that is smaller than the first sound pressure to the first sound pressure. The method may comprise, after outputting the third audio signal, outputting the first audio signal.

As described above, according to an example embodiment, a non-transitory computer readable storage medium may store one or more programs. The one or more programs may comprise instructions to, when executed by a wearable device comprising a speaker, cause the wearable device to detect a user's emergency state. The one or more programs may comprise instructions to, when executed by the wearable device, cause the wearable device to, based on the emergency state, to provide audio corresponding to an emergency siren, output a first audio signal, through the speaker having a first resonant frequency, on a first frequency range with first sound pressure. The one or more programs may comprise instructions to, when executed by the wearable device, cause the wearable device to, after outputting the first audio signal, output a second audio signal through the speaker having a second resonant frequency on a second frequency range having audible sensitivity higher than audible sensitivity in the first frequency range with second sound pressure greater than the first sound pressure. Wherein a resonant frequency of the speaker may be changed from the first resonant frequency to the second resonant frequency lower than the first resonant frequency in accordance with outputting the first audio signal.

For example, the one or more programs may comprise instructions to, when executed by the wearable device, cause the wearable device to, after outputting the second audio signal, output a third audio signal with third sound pressure smaller than the first sound pressure.

For example, the one or more programs may comprise instructions to, when executed by the wearable device, cause the wearable device to, output the first audio signal through the speaker to burn-in the speaker. The one or more programs may comprise instructions to, when executed by the wearable device, cause the wearable device to, after outputting the first audio signal, output the second audio signal through the burned-in speaker. Wherein the resonant frequency of the speaker may be changed from the first resonant frequency to the second resonant frequency as the speaker is burned-in.

For example, the second sound pressure may include full-scale sound pressure.

For example, the one or more programs may comprise instructions to, when executed by the wearable device, cause the wearable device to, based on the emergency state, repeatedly output the first audio signal and the second audio signal according to a designated period to provide the audio corresponding to an emergency siren.

For example, the one or more programs may comprise instructions to, when executed by the wearable device, cause the wearable device to, based on the emergency state, repeatedly output the first audio signal, the second audio signal, and the third audio signal according to a designated period to provide the audio corresponding to an emergency siren.

For example, the one or more programs may comprise instructions to, when executed by the wearable device, cause the wearable device to, while providing the audio corresponding to an emergency siren, detect that the emergency state of the user is ended. The one or more programs may comprise instructions to, when executed by the wearable device, cause the wearable device to, based on the end of the emergency state, cease outputting the first audio signal and the second audio signal.

For example, the wearable device may further comprise a housing and a wrist-wearable structure comprising a strap detachably coupled to the housing. The wrist-wearable structure may comprise a first part, and a second part of the wrist-wearable structure detachable from the first part of the wrist-wearable structure. The housing may comprise a front side, a lateral side comprising a first portion detachably coupled to the first part of the wrist-wearable structure, a second portion opposite the first portion of the housing and coupled to the second part of the wrist-wearable structure, a third portion between the first portion of the housing and the second portion of the housing, and a fourth portion opposite the third portion and between the first portion of the housing and the second portion of the housing, and a rear side configured to be in contact with a wrist of a user wearing the wearable device. The third portion of the housing may comprise a first speaker hole having a first size and a second speaker hole spaced apart from the first speaker hole and having a second size smaller than the first size. The housing may be aligned with an acoustic duct between the speaker and the second speaker hole. Wherein the wearable device may be configured to output the audio signal from the speaker through the acoustic duct and the second speaker hole.

For example, the one or more programs may comprise instructions to, when executed by the wearable device, cause the speaker to amplify an audio signal generated by digital-to-analog converter (DAC) circuitry in power management integrated circuitry (PMIC) of the wearable device.

For example, the one or more programs may comprise instructions to, when executed by the wearable device, cause the wearable device to, based on the emergency state, to provide the audio corresponding to an emergency siren, output a third audio signal on the first frequency range through the speaker having the first resonant frequency with fourth sound pressure that gradually increases within a range from third sound pressure that is smaller than the first sound pressure to the first sound pressure. The one or more programs may comprise instructions to, when executed by the wearable device, cause the wearable device to, after outputting the third audio signal, output the first audio signal.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

No claim element is to be construed under the provisions of 35 U.S.C. § 112, sixth paragraph, unless the element is expressly recited using the phrase "means for" or "means".

What is claimed is:

1. A wearable device comprising:

memory, comprising one or more storage mediums, storing instructions;

a speaker; and at least one processor comprising processing circuitry, wherein the instructions, when executed by the at least one processor individually or collectively, cause the wearable device to:

detect a user's emergency state, based on the emergency state, to provide audio corresponding to an emergency siren:

output a first audio signal, through the speaker having a first resonant frequency, on a first frequency range with first sound pressure; and after outputting the first audio signal, output a second audio signal through the speaker having a second resonant frequency on a second frequency range having audible sensitivity higher than audible sensitivity in the first frequency range with second sound pressure greater than the first sound pressure, wherein a resonant frequency of the speaker, is changed from the first resonant frequency to the second resonant frequency lower than the first resonant frequency in accordance with outputting the first audio signal.

2. The wearable device of claim 1, wherein the instructions, when executed by the at least one processor individually or collectively, cause the wearable device to:

after outputting the second audio signal, output a third audio signal with third sound pressure less than the first sound pressure.

3. The wearable device of claim 1, wherein the instructions, when executed by the at least one processor individually or collectively, cause the wearable device to:

output the first audio signal through the speaker to burn-in the speaker, and after outputting the first audio signal, output the second audio signal through the burned-in speaker, wherein the resonant frequency of the speaker, is changed from the first resonant frequency to the second resonant frequency as the speaker is burned-in.

4. The wearable device of claim 1, wherein the second sound pressure, includes full-scale sound pressure.

5. The wearable device of claim 1, wherein the instructions, when executed by the at least one processor individually or collectively, cause the wearable device to:

based on the emergency state, repeatedly output the first audio signal and the second audio signal according to a designated period to provide the audio corresponding to an emergency siren.

6. The wearable device of claim 2, wherein the instructions, when executed by the processor individually or collectively, cause the wearable device to:

based on the emergency state, repeatedly output the first audio signal, the second audio signal, and the third audio signal according to a designated period to provide the audio corresponding to an emergency siren.

7. The wearable device of claim 1, wherein the instructions, when executed by the at least one processor individually or collectively, cause the wearable device to:

while providing the audio corresponding to an emergency siren, detect that the emergency state of the user is ended, and based on the end of the emergency state, cease outputting the first audio signal and the second audio signal.

8. The wearable device of claim 1 further comprises, a housing; and a wrist-wearable structure comprising a strap detachably coupled to the housing, wherein the wrist-wearable structure comprises, a first part; and a second part of the wrist-wearable structure detachable from the first part of the wrist-wearable structure, wherein the housing comprises, a front side;

a lateral side comprising a first portion detachably coupled to the first part of the wrist-wearable structure, a second portion opposite the first portion of the housing and coupled to the second part of the wrist-wearable structure, a third portion between the first portion of the housing and the second portion of the housing, and a fourth portion opposite the third portion and between the first portion of the housing and the second portion of the housing; and a rear side configured to be in contact with a wrist of a user wearing the wearable device, wherein the third portion of the housing comprises, a first speaker hole having a first size and a second speaker hole spaced apart from the first speaker hole and having a second size smaller than the first size, wherein the housing is:

aligned with an acoustic duct between the speaker and the second speaker hole, wherein the wearable device is configured to output the audio signal from the speaker is:

through the acoustic duct and the second speaker hole.

9. The wearable device of claim 1, wherein the speaker is configured to, amplify an audio signal generated by digital-to-analog converter (DAC) circuitry in power management integrated circuitry (PMIC) of the wearable device.

10. The wearable device of claim 1, wherein the instructions, when executed by the at least one processor individually or collectively, cause the wearable device to:

based on the emergency state, to provide the audio corresponding to an emergency siren:

output a third audio signal on the first frequency range through the speaker having the first resonant frequency with fourth sound pressure that increases within a range from third sound pressure less than the first sound pressure to the first sound pressure, and after outputting the third audio signal, output the first audio signal.

11. A method executed in a wearable device comprising a speaker, the method comprising:

detecting a user's emergency state, based on the emergency state, to provide audio corresponding to an emergency siren:

outputting a first audio signal, through the speaker having a first resonant frequency, on a first frequency range with first sound pressure; and after outputting the first audio signal, outputting a second audio signal through the speaker having a second resonant frequency on a second frequency range having audible sensitivity higher than audible sensitivity in the first frequency range with second sound pressure greater than the first sound pressure, wherein a resonant frequency of the speaker, is changed from the first resonant frequency to the second resonant frequency lower than the first resonant frequency in accordance with outputting the first audio signal.

12. The method of claim 11, the method comprising:

after outputting the second audio signal, outputting a third audio signal with third sound pressure less than the first sound pressure.

13. The method of claim 11, the method comprising:

outputting the first audio signal through the speaker to burn-in the speaker, and after outputting the first audio signal, outputting the second audio signal through the burned-in speaker, wherein the resonant frequency of the speaker, is changed from the first resonant frequency to the second resonant frequency as the speaker is burned-in.

14. The method of claim 11, the method comprising:

wherein the second sound pressure includes full-scale sound pressure.

15. The method of claim 11, the method comprising:

based on the emergency state, repeatedly outputting the first audio signal and the second audio signal according to a designated period to provide the audio corresponding to an emergency siren.

16. The method of claim 12, the method comprising:

based on the emergency state, repeatedly outputting the first audio signal, the second audio signal, and the third audio signal according to a designated period to provide the audio corresponding to an emergency siren.

17. The method of claim 11, the method comprising:

while providing the audio corresponding to an emergency siren, detecting that the emergency state of the user is ended, and based on the end of the emergency state, ceasing outputting the first audio signal and the second audio signal.

18. A non-transitory computer-readable storage medium storing one or more programs, the one or more programs comprising instructions to, when executed by a wearable device comprising a speaker, cause the wearable device to:

detect a user's emergency state, based on the emergency state, to provide audio corresponding to an emergency siren:

output a first audio signal, through the speaker having a first resonant frequency, on a first frequency range with first sound pressure; and after outputting the first audio signal, output a second audio signal through the speaker having a second resonant frequency on a second frequency range having audible sensitivity higher than audible sensitivity in the first frequency range with second sound pressure greater than the first sound pressure, wherein a resonant frequency of the speaker, is changed from the first resonant frequency to the second resonant frequency lower than the first resonant frequency in accordance with outputting the first audio signal.

19. The non-transitory computer-readable storage medium of claim 18, the one or more programs comprising instructions to, when executed by the wearable device, cause the wearable device to:

after outputting the second audio signal, output a third audio signal with third sound pressure smaller than the first sound pressure.

20. The non-transitory computer-readable storage medium of claim 18, the one or more programs comprising instructions to, when executed by the wearable device, cause the wearable device to:

output the first audio signal through the speaker to burn-in the speaker, and after outputting the first audio signal, output the second audio signal through the burned-in speaker.

* * * * *